US010192050B2

(12) United States Patent
Srivastav et al.

(10) Patent No.: US 10,192,050 B2
(45) Date of Patent: Jan. 29, 2019

(54) METHODS, SYSTEMS, APPARATUS, AND STORAGE MEDIA FOR USE IN DETECTING ANOMALOUS BEHAVIOR AND/OR IN PREVENTING DATA LOSS

(71) Applicant: General Electric Company, Schenectady, NY (US)

(72) Inventors: Abhishek Srivastav, San Ramon, CA (US); Shiva Prasad Kasiviswnathan, Dublin, CA (US); Scott Charles Evans, Niskayuna, NY (US); Philip Paul Beauchamp, Rexford, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/964,829

(22) Filed: Dec. 10, 2015

(65) Prior Publication Data
US 2017/0213025 A1    Jul. 27, 2017

Related U.S. Application Data

(60) Provisional application No. 62/248,784, filed on Oct. 30, 2015.

(51) Int. Cl.
*G06F 21/55* (2013.01)
*G06F 21/60* (2013.01)

(52) U.S. Cl.
CPC ............ *G06F 21/552* (2013.01); *G06F 21/60* (2013.01); *G06F 2221/034* (2013.01)

(58) Field of Classification Search
CPC ............ H04L 63/1416; H04L 63/1425; H04L 63/1441; G06F 21/554; G06F 2221/034; G06F 21/552; G06F 21/60
See application file for complete search history.

(56) References Cited

U.S. PATENT DOCUMENTS 8,312,542 B2   11/2012   Eiland et al.
8,327,443 B2   12/2012   Eiland et al.
8,375,446 B2    2/2013   Eiland et al.
(Continued)

*Primary Examiner* — Yonas A Bayou
(74) *Attorney, Agent, or Firm* — Buckley, Maschoff & Talwalkar LLC

(57) ABSTRACT

In one aspect, a method includes: receiving information defining a plurality of different actions that may be performed by users; receiving information indicating a relative frequency at which each of the different actions was performed by each of a plurality of users over each of one or more periods of time; determining a plurality of different characteristic behaviors based at least in part on the information indicating the relative frequency at which each of the different actions was performed by each of the plurality of users over each of one or more periods of time, wherein each one of the different characteristic behaviors defines a relative frequency of performance of each of the different actions; receiving information indicating a relative frequency at which each of the different actions was performed by a user over a period of time; and determining a representation of the relative frequency at which each of the different actions was performed by the user over the period of time as a weighted combination of the different characteristic behaviors each of which defines a relative frequency of performance of each of the different actions.

25 Claims, 25 Drawing Sheets

(56) References Cited

U.S. PATENT DOCUMENTS

| | | | |
|---|---|---|---|
| 8,521,773 B2 | 8/2013 | Evans et al. | |
| 9,106,689 B2 | 8/2015 | Steinbrecher et al. | |
| 2003/0167402 A1* | 9/2003 | Stolfo | H04L 51/12 726/23 |
| 2007/0156696 A1* | 7/2007 | Lim | G06F 21/6218 |
| 2008/0047010 A1* | 2/2008 | Marceau | G06F 21/55 726/23 |
| 2008/0059474 A1* | 3/2008 | Lim | G06F 17/3089 |
| 2008/0178293 A1* | 7/2008 | Keen | H04L 41/12 726/23 |
| 2009/0210504 A1* | 8/2009 | Shuster | H04L 51/28 709/206 |
| 2010/0284282 A1* | 11/2010 | Golic | H04L 43/022 370/242 |
| 2012/0137367 A1* | 5/2012 | Dupont | G06F 21/00 726/25 |
| 2013/0097701 A1* | 4/2013 | Moyle | G06F 21/552 726/22 |
| 2013/0304395 A1* | 11/2013 | Naidu | G01N 27/333 702/25 |
| 2014/0041032 A1* | 2/2014 | Scheper | H04L 63/14 726/23 |
| 2014/0298112 A1* | 10/2014 | Otsuka | G06F 11/3452 714/47.3 |
| 2014/0372348 A1* | 12/2014 | Lehmann | G06K 9/6265 706/12 |
| 2015/0020207 A1 | 1/2015 | Kasiviswanthan et al. | |

* cited by examiner

| DATE | USER ID | ACTION TYPE | FILE NAME (IF APPL) | | | | |
|---|---|---|---|---|---|---|---|
| 11/3/13 | 001 | 8 | | | | | |
| ⋮ | ⋮ | ⋮ | | | | | |
| 11/3/13 | 570 | 6 | | | | | |
| 11/4/13 | 570 | 6 | | | | | |
| 11/4/13 | 570 | 2 | | | | | |
| 11/4/13 | 570 | 4 | | | | | |
| 11/5/13 | 570 | 6 | | | | | |
| 11/5/13 | 570 | 6 | | | | | |
| 11/6/13 | 570 | 2 | | | | | |
| 11/6/13 | 570 | 4 | | | | | |
| 11/7/13 | 570 | 4 | | | | | |
| 11/7/13 | 570 | 6 | | | | | |
| 11/7/13 | 570 | 6 | | | | | |
| ⋮ | ⋮ | ⋮ | | | | | |
| 11/4/13 | 999 | 8 | | | | | |
| 11/4/13 | 999 | 10 | | | | | |

*FIG. 3A*

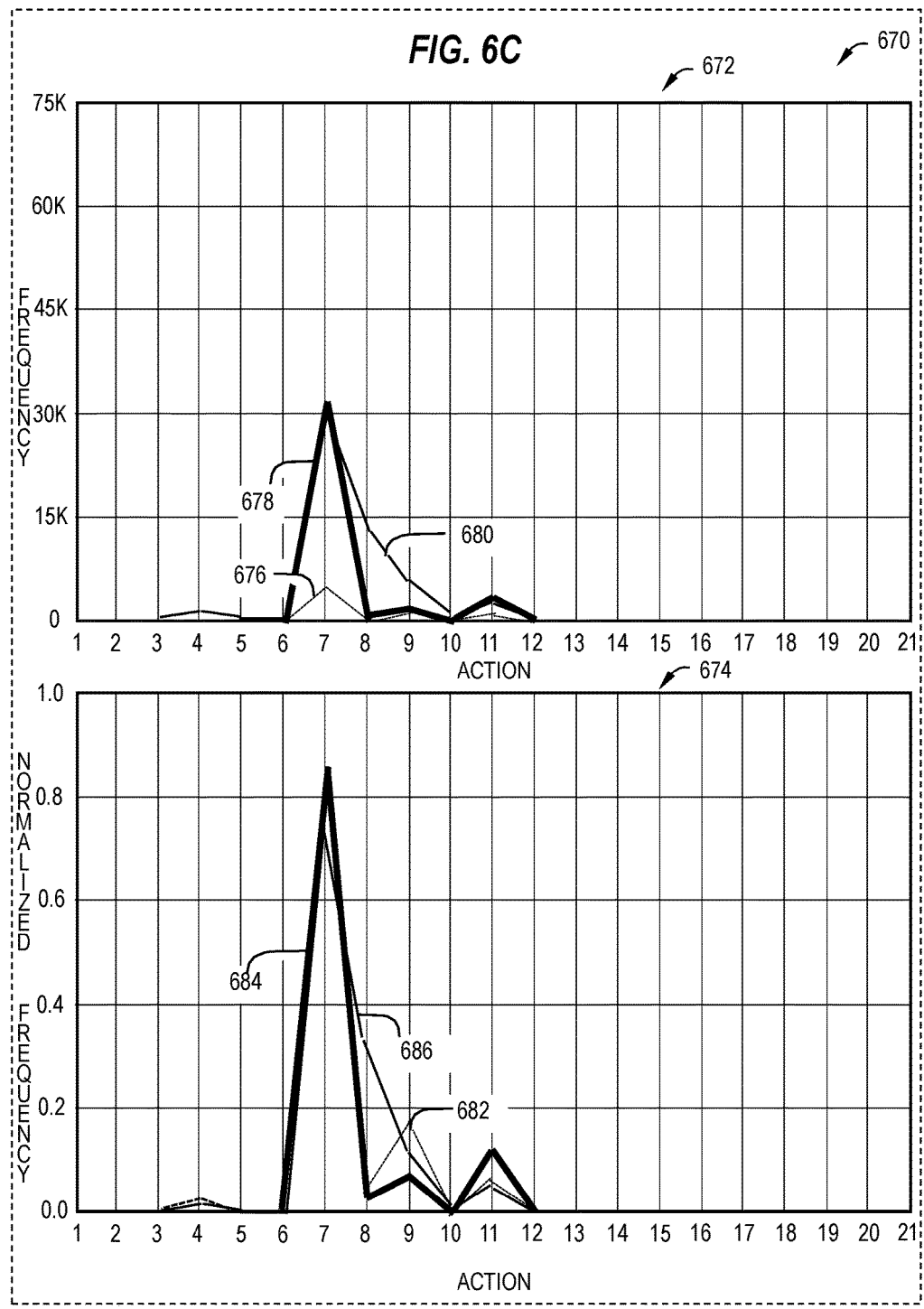

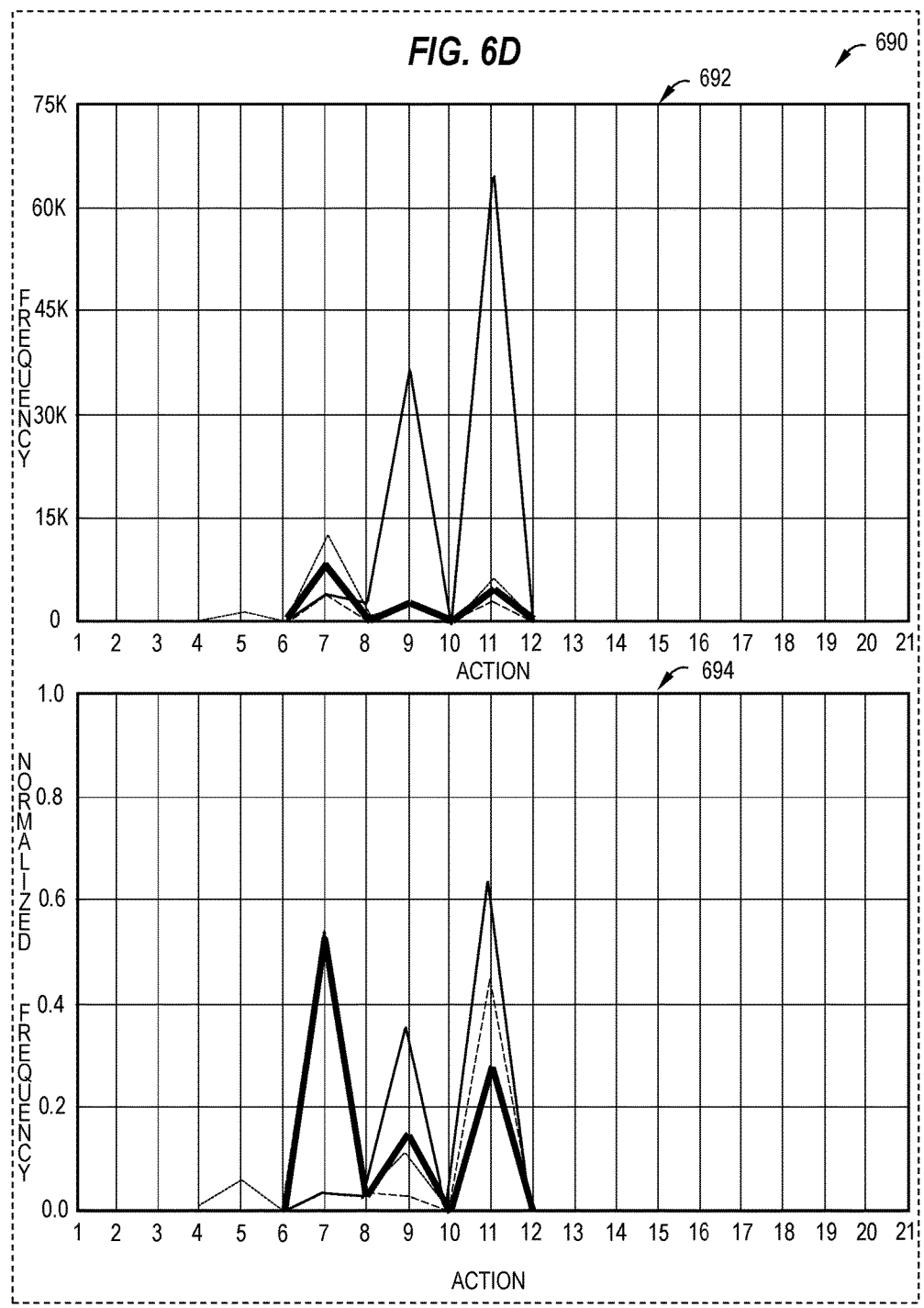

| (PERIOD #) START DATE | USER ID | WEIGHT FOR CHARACTERISTIC BEHAVIOR 1 | WEIGHT FOR CHARACTERISTIC BEHAVIOR 2 | WEIGHT FOR CHARACTERISTIC BEHAVIOR 3 | ... | WEIGHT FOR CHARACTERISTIC BEHAVIOR r |
|---|---|---|---|---|---|---|
| (1) 11/3/13 | 001 | $w_{1,1,1}$ | $w_{1,1,2}$ | $w_{1,1,3}$ | ... | $w_{1,1,r}$ |
| (2) 11/10/13 | 001 | $w_{1,2,1}$ | $w_{1,2,2}$ | $w_{1,2,3}$ | ... | $w_{1,2,r}$ |
| (3) 11/17/13 | 001 | $w_{1,3,1}$ | $w_{1,3,2}$ | $w_{1,3,3}$ | ... | $w_{1,3,r}$ |
| (4) 11/27/13 | 001 | $w_{1,4,1}$ | $w_{1,4,2}$ | $w_{1,4,3}$ | ... | $w_{1,4,r}$ |
| ⋮ | ⋮ | ⋮ | ⋮ | ⋮ | ⋯ | ⋮ |
| (1) 11/3/13 | 570 | $w_{570,1,1}$ | $w_{570,1,2}$ | $w_{570,1,3}$ | ... | $w_{570,1,r}$ |
| (2) 11/10/13 | 570 | $w_{570,2,1}$ | $w_{570,2,2}$ | $w_{570,2,3}$ | ... | $w_{570,2,r}$ |
| (3) 11/17/13 | 570 | $w_{570,3,1}$ | $w_{570,3,2}$ | $w_{570,3,3}$ | ... | $w_{570,3,r}$ |
| (4) 11/27/13 | 570 | $w_{570,4,1}$ | $w_{570,4,2}$ | $w_{570,4,3}$ | ... | $w_{570,4,r}$ |
| ⋮ | ⋮ | ⋮ | ⋮ | ⋮ | ⋯ | ⋮ |
| (1) 11/3/13 | 999 | $w_{999,1,1}$ | $w_{999,1,2}$ | $w_{999,1,3}$ | ... | $w_{999,1,r}$ |
| (2) 11/10/13 | 999 | $w_{999,2,1}$ | $w_{999,2,2}$ | $w_{999,2,3}$ | ... | $w_{999,2,r}$ |
| (3) 11/17/13 | 999 | $w_{999,3,1}$ | $w_{999,3,2}$ | $w_{999,3,3}$ | ... | $w_{999,3,r}$ |
| (4) 11/27/13 | 999 | $w_{999,4,1}$ | $w_{999,4,2}$ | $w_{999,4,3}$ | ... | $w_{999,4,r}$ |
| ⋮ | ⋮ | ⋮ | ⋮ | ⋮ | ⋯ | ⋮ |

*FIG. 8A*

| (PERIOD #) START DATE | USER ID | ACTION TYPE 1 | ACTION TYPE 2 | ACTION TYPE 3 | ACTION TYPE 4 | ACTION TYPE 5 | ACTION TYPE 6 | ACTION TYPE 7 | ... | ACTION TYPE m | |
|---|---|---|---|---|---|---|---|---|---|---|---|
| (1) 11/3/13 | 001 | $e_{1,1,1}$ | $e_{1,1,2}$ | $e_{1,1,3}$ | $e_{1,1,4}$ | $e_{1,1,5}$ | $e_{1,1,6}$ | $e_{1,1,7}$ | ... | $e_{1,1,m}$ | ← 852 |
| (2) 11/10/13 | 001 | $e_{1,2,1}$ | $e_{1,2,2}$ | $e_{1,2,3}$ | $e_{1,2,4}$ | $e_{1,2,5}$ | $e_{1,2,6}$ | $e_{1,2,7}$ | ... | $e_{1,2,m}$ | ← 854 |
| (3) 11/17/13 | 001 | $e_{1,3,1}$ | $e_{1,3,2}$ | $e_{1,3,3}$ | $e_{1,3,4}$ | $e_{1,3,5}$ | $e_{1,3,6}$ | $e_{1,3,7}$ | ... | $e_{1,3,m}$ | ← 856 |
| (4) 11/27/13 | 001 | $e_{1,4,1}$ | $e_{1,4,2}$ | $e_{1,4,3}$ | $e_{1,4,4}$ | $e_{1,4,5}$ | $e_{1,4,6}$ | $e_{1,4,7}$ | ... | $e_{1,4,m}$ | ← 858 |
| ⋮ | ⋮ | ⋮ | ⋮ | ⋮ | ⋮ | ⋮ | ⋮ | ⋮ | ... | ⋮ | ← 860 |
| ⋮ | ⋮ | ⋮ | ⋮ | ⋮ | ⋮ | ⋮ | ⋮ | ⋮ | | ⋮ | ← 862 |
| (1) 11/3/13 | 570 | 0 | 2 | 0 | 17 | 0 | 27 | 0 | ... | $e_{570,1,m}$ | ← 864 |
| (2) 11/10/13 | 570 | 0 | 13 | 0 | 10 | 0 | 26 | 0 | ... | $e_{570,2,m}$ | ← 866 |
| (3) 11/17/13 | 570 | 0 | 9 | 0 | 28 | 0 | 26 | 0 | ... | $e_{570,3,m}$ | ← 868 |
| (4) 11/27/13 | 570 | 0 | 6 | 0 | 20 | 0 | 26 | 0 | ... | $e_{570,4,m}$ | ← 870 |
| ⋮ | ⋮ | ⋮ | ⋮ | ⋮ | ⋮ | ⋮ | ⋮ | ⋮ | ... | ⋮ | ← 872 |
| (1) 11/3/13 | 999 | $e_{999,1,1}$ | $e_{999,1,2}$ | $e_{999,1,3}$ | $e_{999,1,4}$ | $e_{999,1,5}$ | $e_{999,1,6}$ | $e_{999,1,7}$ | ... | $e_{999,1,m}$ | ← 874 |
| (2) 11/10/13 | 999 | $e_{999,2,1}$ | $e_{999,2,2}$ | $e_{999,2,3}$ | $e_{999,2,4}$ | $e_{999,2,5}$ | $e_{999,2,6}$ | $e_{999,2,7}$ | ... | $e_{999,2,m}$ | ← 876 |
| (3) 11/17/13 | 999 | $e_{999,3,1}$ | $e_{999,3,2}$ | $e_{999,3,3}$ | $e_{999,3,4}$ | $e_{999,3,5}$ | $e_{999,3,6}$ | $e_{999,3,7}$ | ... | $e_{999,3,m}$ | ← 878 |
| (4) 11/27/13 | 999 | $e_{999,4,1}$ | $e_{999,4,2}$ | $e_{999,4,3}$ | $e_{999,4,4}$ | $e_{999,4,5}$ | $e_{999,4,6}$ | $e_{999,4,7}$ | ... | $e_{999,4,m}$ | ← 880 |
| ⋮ | ⋮ | ⋮ | ⋮ | ⋮ | ⋮ | ⋮ | ⋮ | ⋮ | ... | ⋮ | |

*FIG. 8B*

METHODS, SYSTEMS, APPARATUS, AND STORAGE MEDIA FOR USE IN DETECTING ANOMALOUS BEHAVIOR AND/OR IN PREVENTING DATA LOSS

FIELD

The present disclosure relates to methods and apparatus for use in detecting suspicious (and/or other anomalous) behavior and/or in preventing data loss.

BACKGROUND

Preventing data loss (sometimes referred to herein as data loss prevention or "DLP") can be vital to protecting the intellectual property, trade secrets and/or internal data of a company and/or other entity.

Some schemes for data loss prevention use rule based systems that examine event records and then apply rules to flag any events records that are suspicious.

The rules make use of advanced knowledge as to the types of events that are known to be suspicious.

BRIEF SUMMARY

There are disadvantages to relying solely on a rule based system. First, some activities that can lead to a data loss may not be known in advance and thus may not be covered by the rules. Second, the creation of new rules to address new knowledge does not occur instantaneously. Third, it can become difficult to maintain the system as the number of rules grow over time.

It has been determined that, it is possible to identify at least some suspicious (and/or other anomalous) activities, without a rule based system that relies on specific rules.

In accordance with a first aspect, a method comprises: receiving, in a processor, information defining a plurality of different actions that may be performed by users; receiving, in a processor, information indicating a relative frequency at which each of the different actions was performed by each of a plurality of users over each of one or more periods of time; determining, by a processor, a plurality of different characteristic behaviors based at least in part on the information indicating the relative frequency at which each of the different actions was performed by each of the plurality of users over each of one or more periods of time, wherein each one of the different characteristic behaviors defines a relative frequency of performance of each of the different actions; receiving, in a processor, information indicating a relative frequency at which each of the different actions was performed by a user over a period of time; and determining, by a processor, a representation of the relative frequency at which each of the different actions was performed by the user over the period of time as a weighted combination of the different characteristic behaviors each of which defines a relative frequency of performance of each of the different actions.

As used herein, the term "indicating" means "indicating directly and/or indirectly".

Thus, the phrase "information indicating" includes "information specifying" and/or "information sufficient to allow determination of".

Thus, relative frequency may be indicated in any manner. In some embodiments, relative frequency may be indicated without normalization, e.g., using actual frequencies.

In some embodiments, the method further comprises determining, by a processor, a difference based at least in part on: (i) the relative frequency at which each of the different actions was performed by a user over a period of time and (ii) the weighted combination representing the relative frequency at which each of the different actions was performed by the user over the period of time; and comparing, by a processor, the difference to a criteria.

In some embodiments, the method further comprises displaying, based at least in part on the comparison, a result indicating whether anomalous behavior is detected on the part of the user.

In some embodiments, the determining, by a processor, a plurality of different characteristic behaviors based at least in part on the information indicating the relative frequency at which each of the different actions was performed by each of the plurality of users over each of one or more periods of time, wherein each one of the different characteristic behaviors defines a relative frequency of performance of each of the different actions, is performed without human supervision.

In some embodiments, the information indicating the relative frequency at which each of the different actions was performed by each of the plurality of users over each of one or more periods of time includes: a plurality of user-time period combinations, each one of the user-time period combinations being associated with a respective combination of one of the plurality of users and one of the one or more periods of time; the method further comprising: determining, by a processor, for each user-time period combination, a representation of the relative frequency at which each of the different actions was performed by the associated one of the plurality of users over the associated one of the one or more periods of time, as a weighted combination of the different characteristic behaviors each of which defines a relative frequency of performance of each of the different actions.

In some embodiments, the method further comprises: (a) defining, by a processor, a user-time period combination to be an outlier; (b) determining, by a processor, a new plurality of different characteristic behaviors, based at least in part on the information indicating the relative frequency at which each of the different actions was performed by each of the plurality of users over each of one or more periods of time with the exception of each user-time period combination defined to be an outlier, wherein each one of the different characteristic behaviors in the new plurality of different characteristic behaviors defines a relative frequency of performance of each of the different actions; and (c) repeating (a)-(b) until a termination criteria is reached.

In some embodiments, the method further comprises: defining, by a processor, a count indicating a number of different characteristic behaviors; wherein the determining, by a processor, a plurality of different characteristic behaviors comprises: determining, by a processor, a plurality of different characteristic behaviors that includes the indicated number of different characteristic behaviors, the method further comprising: (a) incrementing, by a processor, the count indicating a number of different characteristic behaviors; (b) determining, by a processor, a new plurality of different characteristic behaviors that includes the indicated number of different characteristic behaviors, based at least in part on the information indicating the relative frequency at which each of the different actions was performed by each of the plurality of users over each of one or more periods of time, wherein each one of the different characteristic behaviors in the new plurality of different characteristic behaviors defines a relative frequency of performance of each of the different actions; and (c) repeating (a)-(b) until a termination criteria is reached.

In some embodiments, the plurality of different actions is a first plurality of different actions and the method further comprises: determining if a change criteria is satisfied; and if it is determined that the change criteria is satisfied, determining a new plurality of different characteristic behaviors based at least in part on information indicating a relative frequency at which each of a second plurality of different actions was performed by each of a plurality of users over each of a second one or more periods of time, wherein each one of the different characteristic behaviors in the new plurality of different characteristic behaviors defines a relative frequency of performance of each of the second plurality of different actions.

In some embodiments, the second plurality of different actions are the same as the first plurality of different actions.

In accordance with another aspect, a non-transitory computer readable storage medium having code stored thereon, the code being executable by a processor to result in a method comprising: receiving information defining a plurality of different actions that may be performed by users; receiving information indicating a relative frequency at which each of the different actions was performed by each of a plurality of users over each of one or more periods of time; determining a plurality of different characteristic behaviors based at least in part on the information indicating the relative frequency at which each of the different actions was performed by each of the plurality of users over each of one or more periods of time, wherein each one of the different characteristic behaviors defines a relative frequency of performance of each of the different actions; receiving information indicating a relative frequency at which each of the different actions was performed by a user over a period of time; and determining a representation of the relative frequency at which each of the different actions was performed by the user over the period of time as a weighted combination of the different characteristic behaviors each of which defines a relative frequency of performance of each of the different actions.

In another aspect, a system comprises: a processor; and a memory, coupled to the processor and storing code executable by the processor; the processor configured to: receive information defining a plurality of different actions that may be performed by users; receive information indicating a relative frequency at which each of the different actions was performed by each of a plurality of users over each of one or more periods of time; determine a plurality of different characteristic behaviors based at least in part on the information indicating the relative frequency at which each of the different actions was performed by each of the plurality of users over each of one or more periods of time, wherein each one of the different characteristic behaviors defines a relative frequency of performance of each of the different actions; receive information indicating a relative frequency at which each of the different actions was performed by a user over a period of time; and determine a representation of the relative frequency at which each of the different actions was performed by the user over the period of time as a weighted combination of the different characteristic behaviors each of which defines a relative frequency of performance of each of the different actions.

BRIEF DESCRIPTION OF THE DRAWINGS

FIG. 3A is a graphical representation of a portion information, in accordance with some embodiments.

FIG. 6C is a view in a graphical user interface, in accordance with some embodiments.

FIG. 6D is a view in a graphical user interface, in accordance with some embodiments.

FIG. 8A is a graphical representation of representations that may be determined, in accordance with some embodiments.

FIG. 8B is a graphical representation of reconstruction errors that may be determined, in accordance with some embodiments.

DETAILED DESCRIPTION

Figure 1:
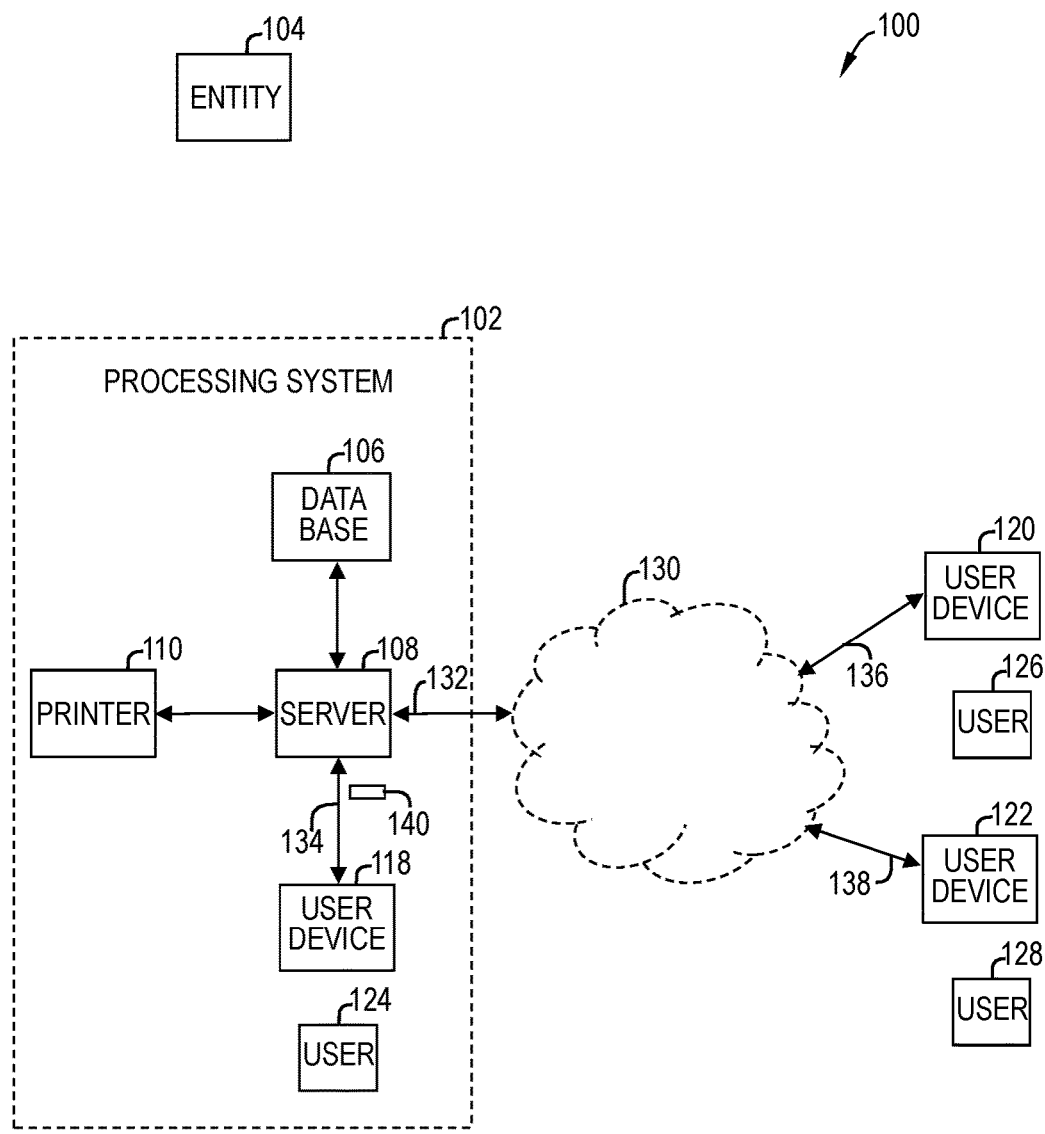
FIG. 1 is a block diagram of a system, in accordance with some embodiments.

FIG. 1 is a block diagram of a system 100, which may be operated by, and/or on behalf of, a company or other entity, and in which suspicious (and/or other anomalous) activity may occur, in accordance with some embodiments.

Referring to FIG. 1, the system 100 includes a processing system 102 operated by, and/or on behalf of, an entity 104, e.g., a company. The processing system 102 may include a database 106, a server 108 and a printer 110. The database 106 may store information collected and/or used by the entity 104. The server 108, which may be coupled to the database 106 and the printer 110 and may communicate therewith, may include one or more processors that execute one or more programs to perform one or more tasks. In some embodiments, the server 108 comprises a file server, a print server, an email server, a web server and/or other type of server. The printer 110 may print files and/or other information.

The system 100 (which is also a processing system) may further include a plurality of user devices, e.g., user devices 118-122, sometimes referred to herein as client devices and/or clients. The user devices, which may be operated by a plurality of users, e.g., 124-128, may be coupled to the server 108 via one or more communication links, e.g., one or more of communication links 130-138, which may define a network (or a portion thereof), e.g., a local area network and/or a wide area network, e.g., the Internet.

One or more of the user devices, e.g., user devices 120-122, may be located remote from the processing system 102 and may be referred to as remote devices. One or more of the user devices, e.g., user device 118, may comprise a desktop computer. One or more of the user devices, e.g., user device 120 and/or user device 122, may comprise a laptop computer, a tablet, a smart phone and/or other type of user device.

Each of the user devices 118 may include one or more processors, input devices and/or output devices. The one or more processors may communicate with the input devices and/or output devices in order to provide user interfaces. The one or more processors may execute one or more programs to perform one or more tasks. One or more of such programs may communicate with the server 108, directly and/or indirectly, to request information, e.g., information 140, from and/or to provide information to the server 108. In some embodiments, one or more of such programs is a browser program that communicates with server 108 to request information from and/or provide information to the server 108. In some embodiments, one or more portions of the information received from and/or provided to a user device may be stored in the database 106 of processing system 102.

While only one server, one database, one printer and three user devices are shown in FIG. 1, the system may include any number and type(s) of devices.

One or more of the users, e.g., users 124-128, may be employed by and/or may perform tasks for the entity 104. The tasks may require that the one or more users interact with one or more of the devices to perform various actions.

However, one or more of the users may also interact with one or more of the devices to perform one or more actions that are not intended for the benefit of the entity 104, e.g., actions intended to damage and/or transfer information out of the entity 104.

Some schemes for data loss prevention use rule based systems that examine event records and then apply rules to flag any events records that are suspicious.

There are disadvantages to relying solely on a rule based system.

First, some activities that can lead to a data loss may not be known in advance and thus may not be covered by the rules. Second, the creation of new rules to address new knowledge is not instantaneously. Third, it can become difficult to maintain the system as the number of rules grow over time.

It has been determined that, it is possible to identify at least some suspicious (and/or other anomalous) activities, without a rule based system that relies on specific rules.

In some embodiments, nominal user behavior may be discovered from user event-logs using unsupervised machine learning without requiring the knowledge of expected and/or suspicious behavior. A plurality of different characteristic behaviors are learned (and/or otherwise determined) and model the relationships between different user actions within an entity. If a behavior (of a user) is found that does not conform to the learned model, it may be flagged as suspicious and the most offending action responsible for the suspicious activity may be reported. The approach is able to detect at least some suspicious and/or other anomalous behavior previously unknown or missed by a rule-based system. In some embodiments, the learning is repeated if there is a significant change to the operation of the entity. (The actions that may be performed by users after a significant change may or may not be the same as the actions that may be performed by users prior to the significant change.) In some embodiments, a significant change is a change that satisfies a change criteria.

In accordance with some embodiments, the suspicious (and/or other anomalous) behavior may be identified without requiring expert and/or other human supervision.

In accordance with some embodiments, and as will be further discussed below, a processing system may receive historical data indicative of a relative frequency at which each of a plurality of different actions are performed by each of a plurality of users over each of one or more periods of time. The system may determine characteristic behaviors based at least in part on the historical data and may further determine a representation of actions performed by a user over a period of time as a weighted combination of the characteristic behavior types. The representation of the actions as a weighted combination of the characteristic behavior types improves the ability of the system to identify potentially suspicious (and/or otherwise anomalous) behavior. The system may determine a difference based at least in part on the weighted combination of the characteristic behaviors and the difference may be compared to criteria to identify potentially suspicious (and/or otherwise anomalous) behavior.

Figure 2:
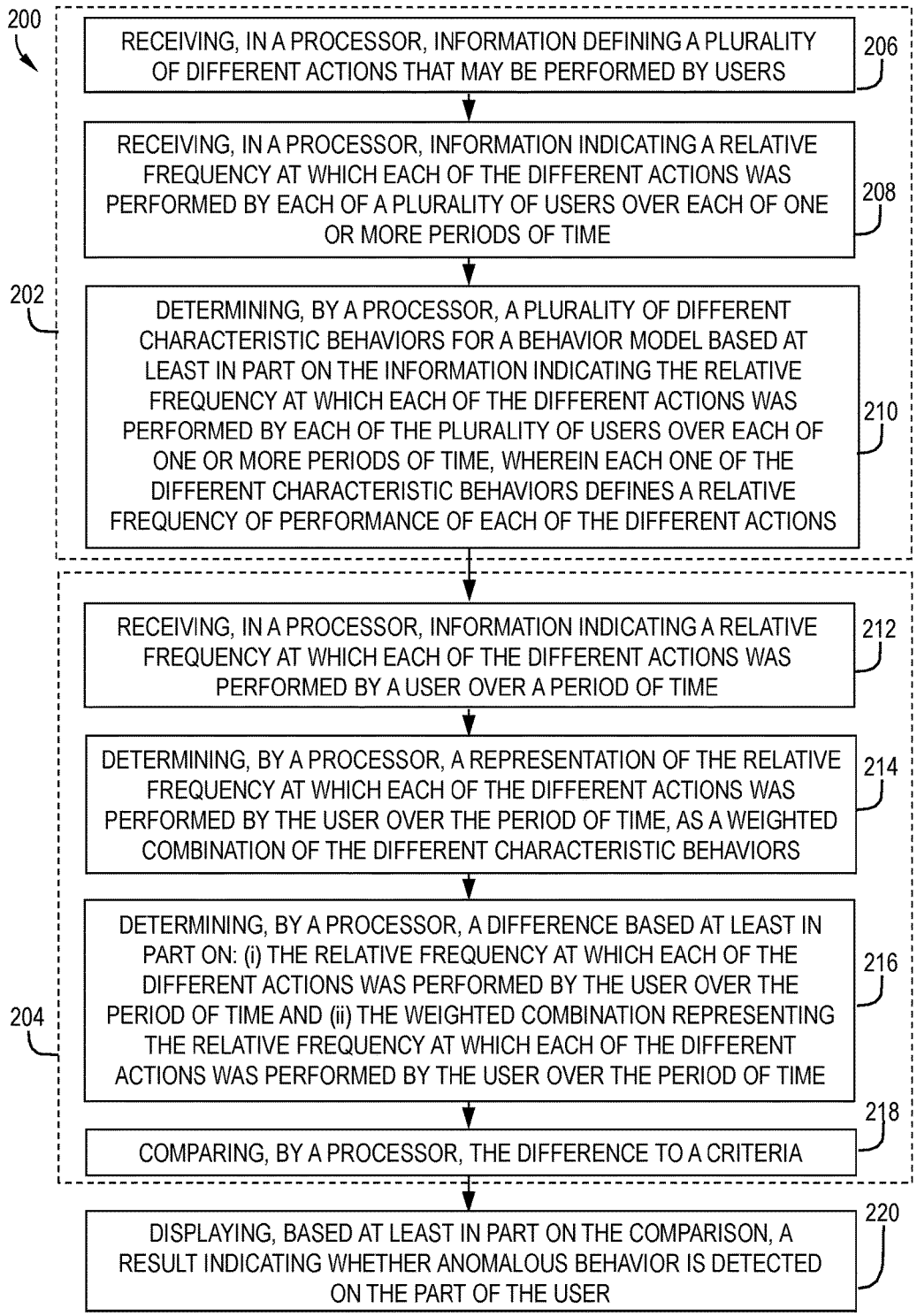
FIG. 2 is a flowchart of a method, in accordance with some embodiments.

FIG. 2 is a flow chart of a method 200, in accordance with some embodiments.

In accordance with some embodiments, the method may be used in detecting suspicious (and/or otherwise anomalous) behavior and/or in preventing data loss.

The method 200 is not limited to the order shown in the flow chart. Rather, embodiments of the method 200 may be performed in any order that is practicable. For that matter, unless stated otherwise, any method disclosed herein may be performed in any order that is practicable.

Unless stated otherwise, the method 200 (and/or any other method disclosed herein) may be performed by in any manner. In some embodiments, the method, (and/or any other method disclosed herein) or one or more portions thereof, may be performed by one or more portions of the system 100 and/or any other processing system. As further described herein, in some embodiments, a processing system may comprise hardware, software (e.g., low level language code, high language code, microcode), firmware, or any combination thereof.

In some embodiments, a non-transitory computer readable medium may have instructions stored thereon, which if executed by a machine result in performance of the method 200 (and/or any other method disclosed herein) or one or more portions thereof.

Referring to FIG. 2, in accordance with some embodiments, the method may include a model determination phase 202 and a suspicious (and/or other anomalous) behavior detection phase 204.

At 206 in the model determination phase 202, the method may include receiving, in a processor, information defining a plurality of different actions that may be performed by users.

As used herein, the term "defining" means "defining directly and/or indirectly". Thus, the phrase "defining a plurality of different actions" includes "specifying" and/or "providing information sufficient to allow determination of".

As further described below, in some embodiments, each occurrence of each such action (sometimes referred to herein as an event) has been, and/or will be, logged by one or more devices in the system (e.g., one or more of user devices 118-122), for use in identifying suspicious (and/or other anomalous) behavior.

The information defining the plurality of different actions may have any form(s) and may be received from any source(s), directly and/or indirectly, external and/or internal to, the processor.

In some embodiments, each of the different actions is one that a user would perform via one or more interaction with one or more of the devices (e.g., one or more of user devices 118-122) in the system 100.

One or more of the actions may be an action that is commonly performed, and thus individually, does not indicate suspicious (and/or other anomalous) behavior. For example, in some embodiments, the actions may include file open, file move, file copy, file delete, file rename, network transfer upload, file print, email, etc.

The actions are not limited to the actions mentioned above. Rather, any combination of actions may be used.

In some embodiments, the total number of actions and/or the type(s) of actions may depend upon the characteristics of the system 100, the entity 104 and/or its information. In some embodiments, the actions are defined based on expert knowledge. In some embodiments, the number of different actions may be greater than twenty or thirty, e.g., thirty six (36).

At 208 in the model determination phase 202, the method may further include receiving, in a processor, information indicating a relative frequency at which each of the different actions was performed by each of a plurality of users over each of one or more periods of time. Such information may have any form(s) and may be received from any source(s), directly and/or indirectly, external and/or internal to, the processor.

As used herein, the term "indicating" means "indicating directly and/or indirectly".

Thus, the phrase "information indicating" includes "information specifying" and/or "information sufficient to allow determination of".

Thus, relative frequency may be indicated in any manner. In some embodiments, relative frequency may be indicated without normalization, e.g., using actual frequencies.

As used herein, the phrase "a relative frequency at which each of the different actions was performed by each of a plurality of users over each of one or more periods of time" means "a relative frequency at which a first one of the different actions was performed by a first one of the plurality of users over a first one of the one or more periods of time, a relative frequency at which a second one of the different actions was performed by the first one of the plurality of users over the first one of the one or more periods of time, and so on".

In some embodiments, a period of time has a duration of one week or any other duration of interest. In some other embodiments, the period of time may be less than one week, e.g., one day, or greater than one week, e.g., one month.

A simplified example of a relative frequency at which each of a plurality of to different actions was performed by a user over a period of time is shown in Table 1.

TABLE 1

SIMPLIFIED EXAMPLE OF
RELATIVE FREQUENCY
AT WHICH A USER
PERFORMED ACTIONS
OVER A PERIOD OF TIME

| |  |
|---|---|
| 45% | print file |
| 10% | copy file |
| 45% | email |
| 0% | other |

In some embodiments, the information indicating a relative frequency at which each of the different actions was performed by each of a plurality of users over each of one or more periods of time may be in the form of a data collection that can be queried. One such type of data collection is provided by a product named DIGITAL GUARDIAN (e.g., version 7.0), which is produced by DIGITAL GUARDIAN Inc.

In some embodiments, the data collection is generated, at least in part, by logging each occurrence of each action.

FIG. 3A is a graphical representation 300 of a portion of one such type of data collection, in accordance with some embodiments.

Referring to FIG. 3A, the graphical representation 300 includes a table having a plurality of time-stamped entries, e.g., entries 304-334. Each time-stamped entry is associated with one occurrence of one action. Each time-stamped entry identifies an action, a day and time (of day) that the action was performed, and the user that performed the action.

For example, an entry 302 indicates that on a day of Nov. 3, 2013, a user having a user ID 001 performed action type 8. An entry 306 indicates that on the day of Nov. 3, 2013, a user having a user ID 570 performed action type 6. An entry 308 indicates that on a day of Nov. 4, 2013, the user having the user ID 570 again performed action type 6. An entry 310 indicates that on the day of Nov. 4, 2013, the user having the user ID 570 also performed action type 2. An entry 312 indicates that on the day of Nov. 4, 2013, the user having the user ID 570 also performed action type 4. An entry 314 indicates that on a day of Nov. 5, 2013, the user having the user ID 570 performed action type 6. An entry 330 indicates that on the day of Nov. 4, 2013, a user having a user ID 999 performed action type 8. An entry 332 indicates that on the day of Nov. 4, 2013, the user having the user ID 999 also performed action type 10.

Since each entry in the illustrated table is associated with one occurrence of one action, multiple entries may be needed to indicate the relative frequency at which each of the plurality of different actions was performed by one of the plurality of users over one of the one or more periods of time (sometimes referred to herein as a "user-time period combination").

For example, if the duration of interest is one week and the start time is on a Sunday, then entries 306-326 are all needed to indicate the relative frequency at which each of the plurality of different actions was performed by the user having user ID 570 over a time period of Nov. 3, 2013-Nov. 9, 2013.

It should be noted that the entries associated with a single user-time period combination need not be consecutive and/or contiguous with one another.

In some embodiments, the information may be in the form of aggregated data, which may be created by querying a data collection such as that represented in FIG. 3A and aggregating the results.

Figure 3B:
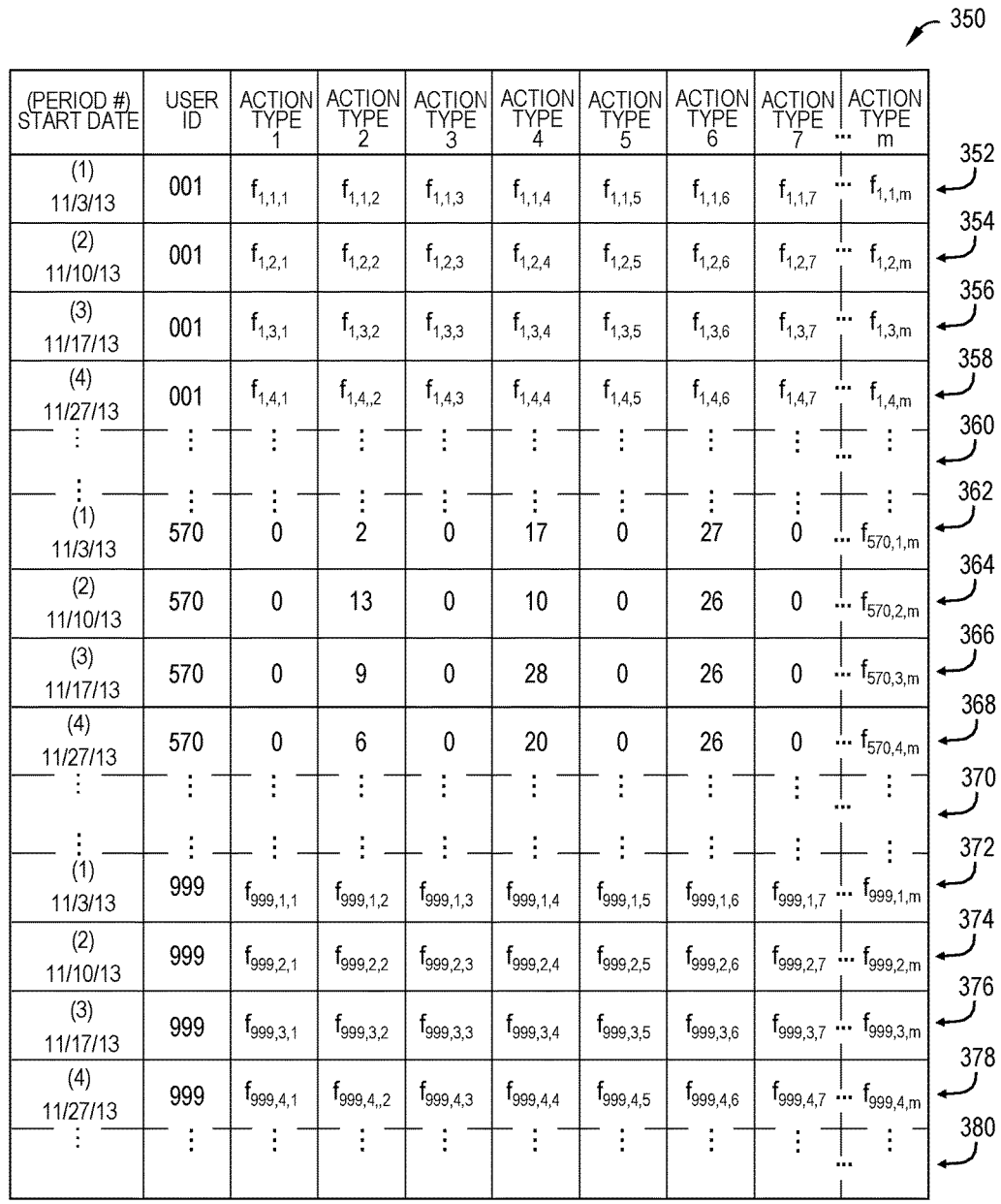
FIG. 3B is a graphical representation of a portion of information, in accordance with some embodiments.

FIG. 3B is a graphical representation 350 of one type of aggregated data, in accordance with some embodiments.

Referring to FIG. 3B, the graphical representation 350 includes a table having a plurality of entries. Each entry includes information identifying one of the plurality of users and one of the one or more periods of time (i.e., a user-time period combination) and further indicating a relative frequency that each of the different actions was performed by the one of the plurality of users over the one of the one or more periods of time.

For example, an entry 352 indicates that during a one week period of time starting on the date Nov. 3, 2013, the user having user ID 001 performed action type 1 times, action type 2 $f_{1,1,2}$ times, action type 3 $f_{1,1,3}$ times, action type 4 $f_{1,1,4}$ times, action type 5 times, action type 6 $f_{1,1,6}$ times, action type 7 times, and so on. An entry 354 indicates that during a one week period of time starting on the date Nov. 10, 2013, the user having user ID 001 performed action type 1 $f_{1,2,1}$ times, action type 2 $f_{1,2,2}$ times, action type 3 $f_{1,2,3}$ times, action type 4 $f_{1,2,4}$ times, action type 5 $f_{1,2,5}$ times, action type 6 $f_{1,2,6}$ times, action type 7 $f_{1,2,7}$ times, and so on.

An entry 362 indicates that during the one week period of time starting on the date Nov. 3, 2013, the user having the user ID 570 performed action type 1 zero times, action type 2 two times, action type 3 zero times, action type 4 seventeen times, action type 5 zero times, action type 6 twenty seven times, action type 7 zero times, and so on. An entry 364 indicates that during the one week period of time starting on the date Nov. 10, 2013, the user having the user ID 570 performed action type 1 zero times, action type 2 thirteen times, action type 3 zero times, action type 4 ten times, action type 5 zero times, action type 6 twenty six times, action type 7 zero times, and so on.

As stated above, a period of time may be any period of time that is of interest. In some embodiments, a period of time may be one day, one week, one month or longer.

Referring again to FIG. 2, at 210 in the model determination phase 202, the method may further include determining, by a processor, a plurality of different characteristic behaviors based at least in part on the information indicating the relative frequency at which each of the different actions was performed by each of the plurality of users over each of one or more periods of time, wherein each one of the different characteristic behaviors defines a relative frequency of performance of each of the different actions.

As will be further discussed below, in accordance with some embodiments, non-negative matrix factorization and/or other iterative method(s) may be used in determining the plurality of different characteristic behaviors.

With an iterative method, multiple sets of characteristic behaviors may be determined. Each set may be characterized as to its accuracy. A set that results in less error than the others may be selected for use.

Non-negative matrix factorization may provide an advantage over some other iterative methods in that it may provide information that may be useful to an analyst who might seek to verify: (i) a model and/or (ii) results produced by the model during a detection phase.

In some embodiments, a set of characteristic behaviors that results in less error than others may do so by more effectively "capturing" any underlying relationships that exist in the information.

A simplified example of a plurality of characteristic behaviors, each one which defines a relative frequency of performance of each of a plurality of different actions is shown in Table 2.

TABLE 2

| SIMPLIFIED EXAMPLE OF CHARACTERISTIC BEHAVIOR #1 | SIMPLIFIED EXAMPLE OF CHARACTERISTIC BEHAVIOR #2 |
| --- | --- |
| 80% print file | 10% print file |
| 10% copy file | 10% copy file |
| 10% email | 80% email |
| 0% other | 0% other |

Figure 4:
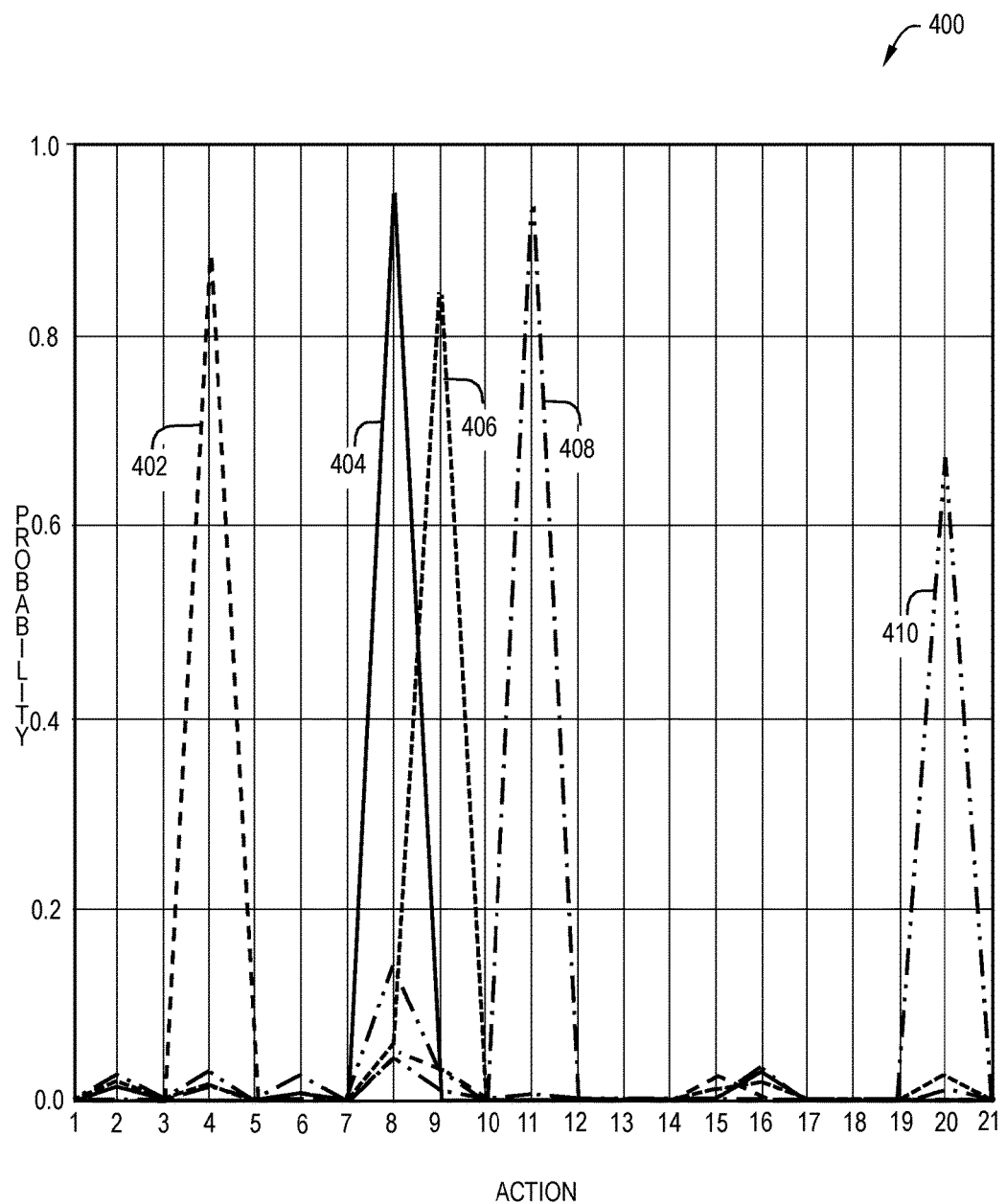
FIG. 4 is a graphical representation of a plurality of different characteristic behaviors, in accordance with some embodiments.
Figure 5A:
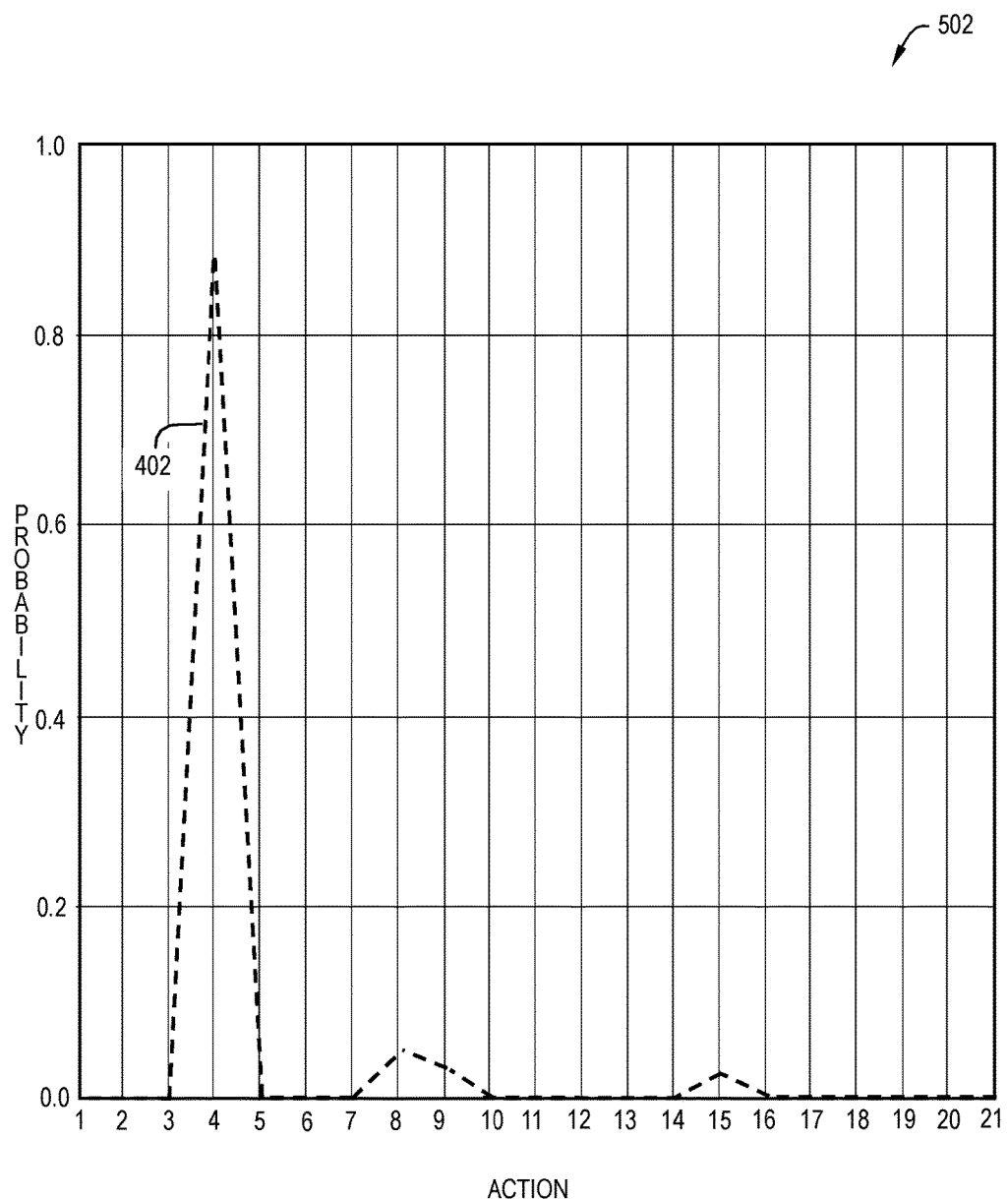
FIG. 5A is a graphical representations of a characteristic behavior, in accordance with some embodiments.
Figure 5B:
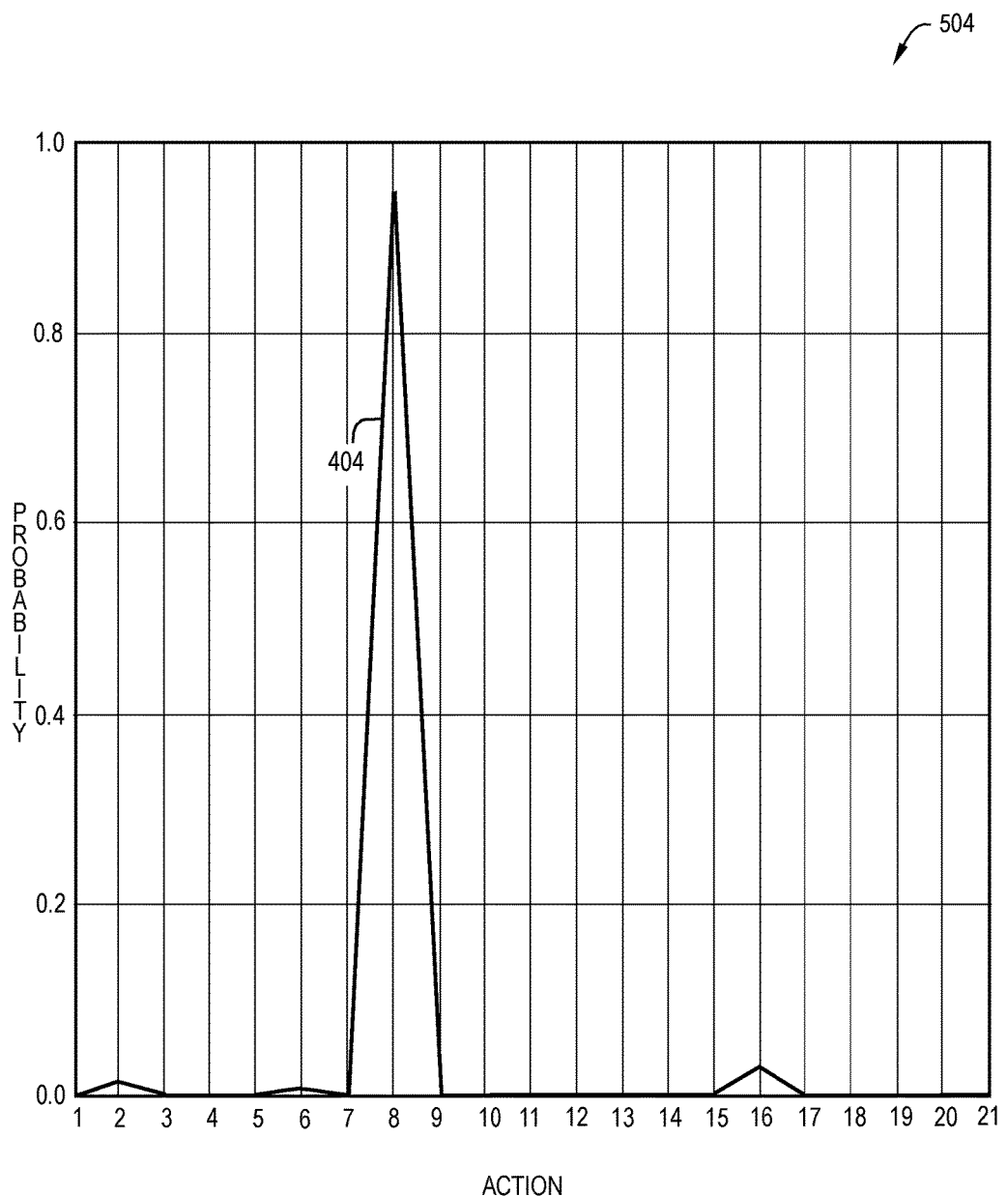
FIG. 5B is a graphical representations of a characteristic behavior, in accordance with some embodiments.
Figure 5C:
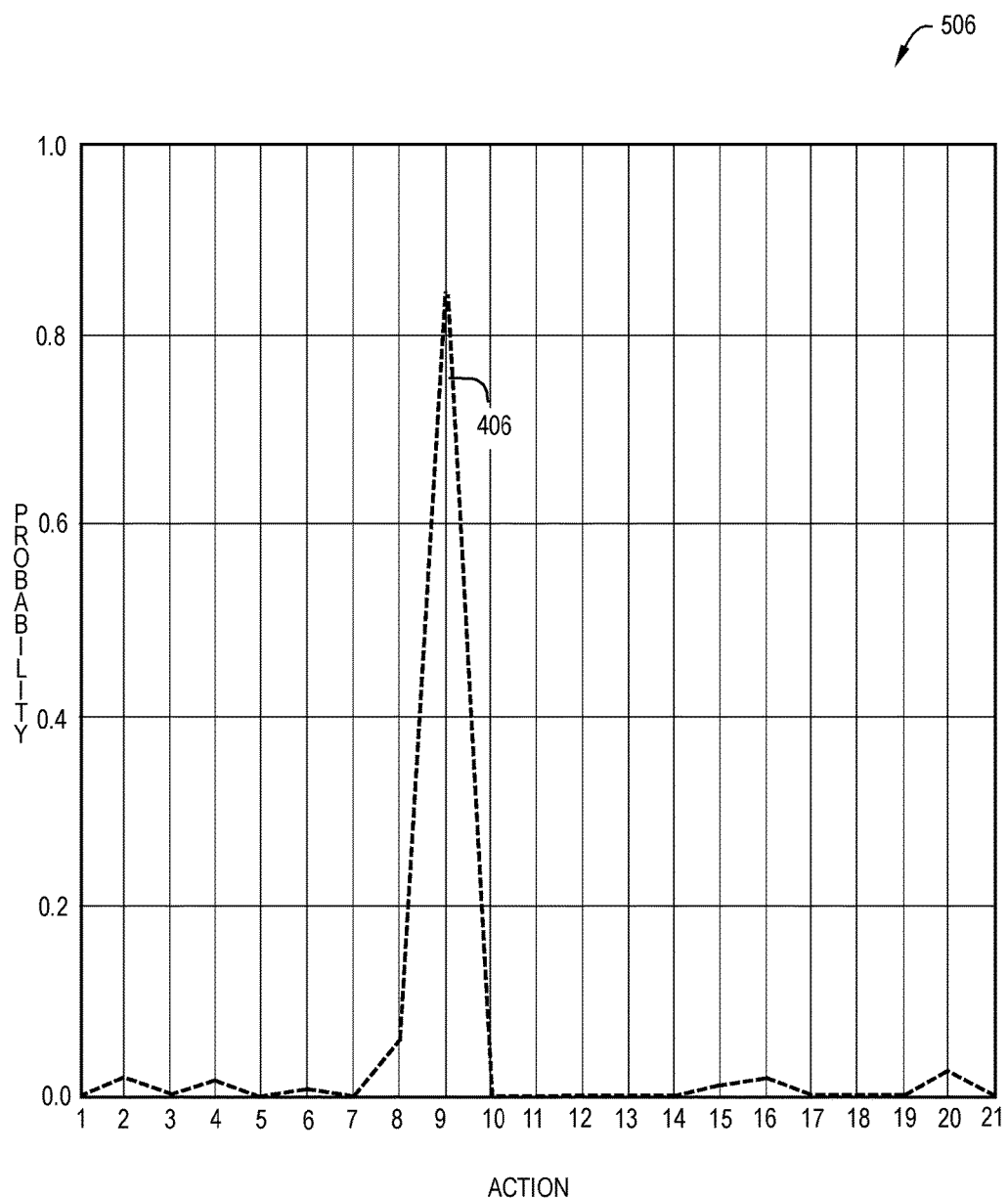
FIG. 5C is a graphical representations of a characteristic behavior, in accordance with some embodiments.
Figure 5D:
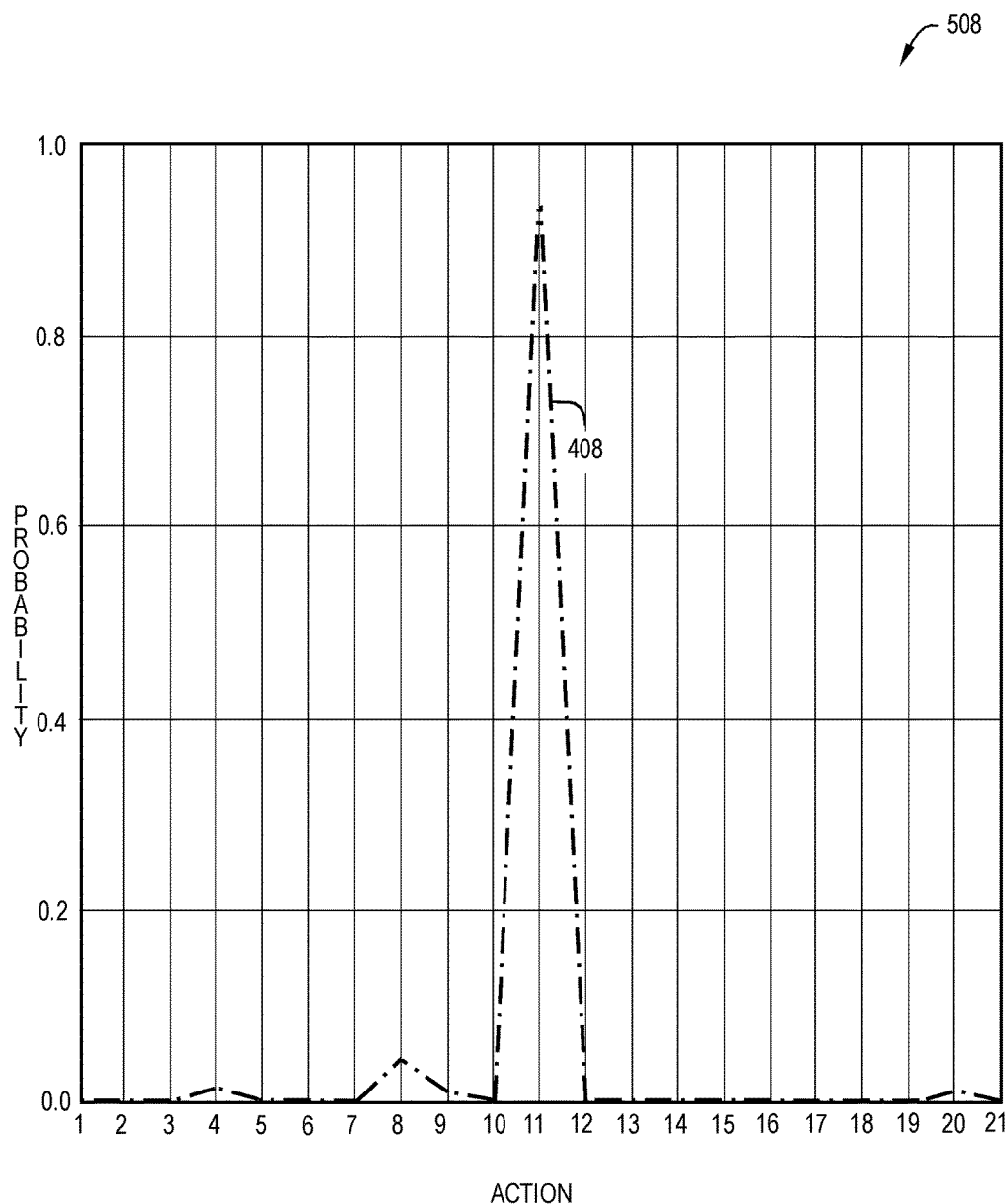
FIG. 5D is a graphical representations of a characteristic behavior, in accordance with some embodiments.
Figure 5E:
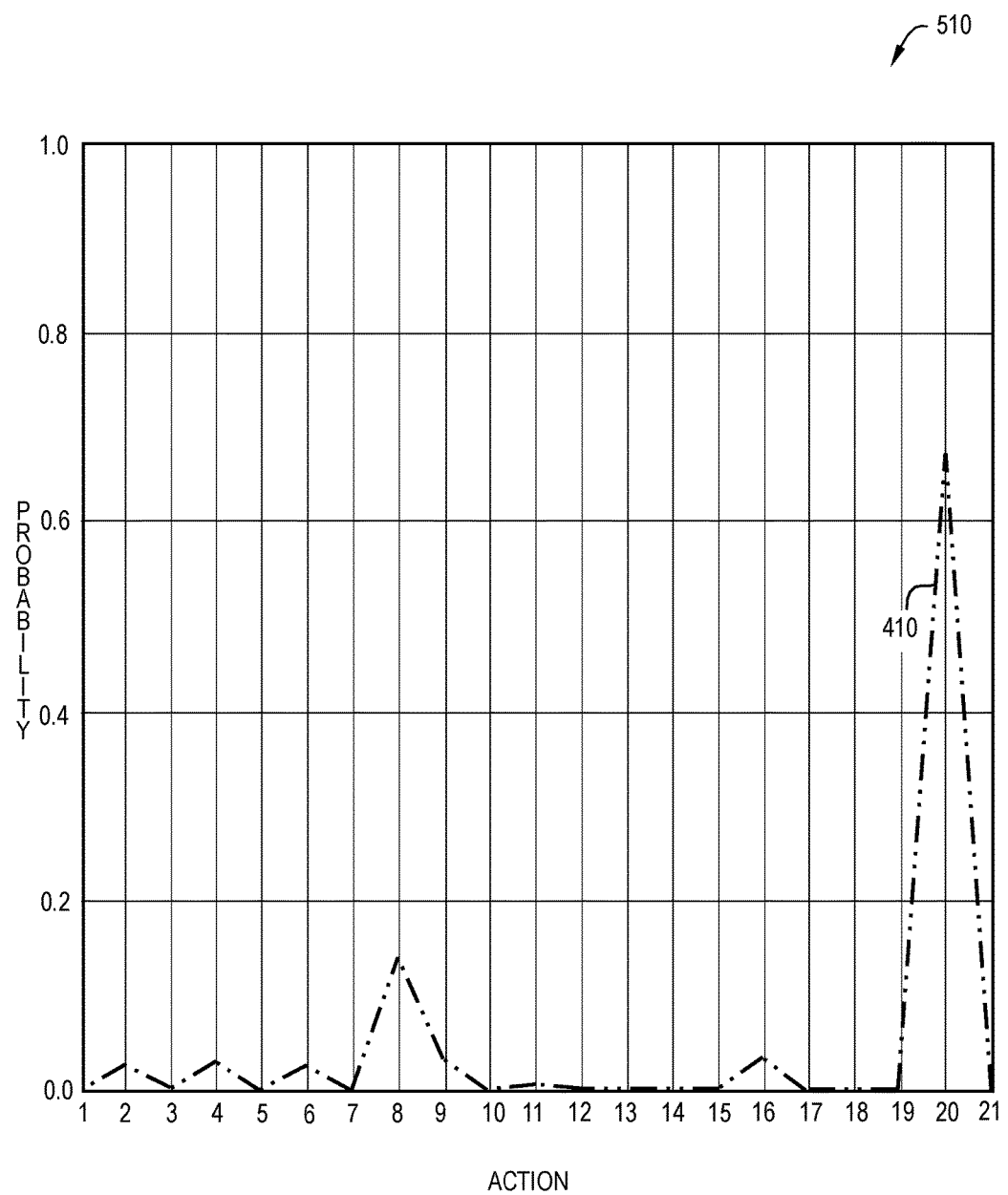
FIG. 5E is a graphical representations of a characteristic behavior, in accordance with some embodiments.

FIG. 4 is a view in a graphical user interface, in accordance with some embodiments.

The view includes a graphical representation 400 (and/or other type of visualization (graphical and/or non-graphical)) of the plurality of different characteristic behaviors that were determined based on information indicating the relative frequency at which each of the different actions was performed by each of the plurality of users over each of one or more periods of time, in accordance with some embodiments.

In some embodiments, the graphical user interface is provided by one or more of the devices in the system 100.

Referring to FIG. 4, the graphical representation 400 includes a plurality of curves, e.g., curves 402-410. Each of the curves, e.g., curves 402-410, represents a different one of the plurality of different characteristic behaviors (sometimes referred to herein as characteristic behaviors 402-410). Each of the curves may be shown in a different color or line type so that a user will be able to distinguish the curves from one another.

For example, curve 402 shows a first one of the characteristic behaviors. Curve 404 shows a second one of the characteristic behavior. Curve 406 shows a third one of the characteristic behaviors. And so on.

Each of the characteristic behaviors defines a relative frequency of performance for each of the different actions.

Action designators (e.g., action 1, action 2, action 3 and so on) representing actions are listed along a first (e.g., horizontal) axis. In the illustrated embodiment, action 3 represents a network transfer upload, action 7 represents a file delete, action 8 represents a file copy, action 9 represents a file move, action 10 represents a file open, and action 11 represents a file rename.

Relative frequency (e.g., probability, percentage, and/or other indicator of relative frequency) values are shown along a second (e.g., vertical) axis. Each curve, e.g., curves 402-410, indicates a relative frequency value for each action designator. The relative frequency shown for a given action designator defines the relative frequency for the action represented by that action designator.

The graphical user interface may also, or may alternatively, provide views that display the different characteristic behaviors 402-410 separately from one another, e.g., one at a time.

FIGS. 5A-5E are graphical representations 502-510 that show the plurality of different characteristic behaviors 402-410, separately from one another, in accordance with some embodiments.

As can be seen from FIGS. 5A-5E, the first characteristic behavior 402 defines a relative frequency of performance that is approximately as follows: 89% action 4, 5% action 8, 3% action 9 and 3% action 15.

The second characteristic behavior 404 defines a relative frequency of performance that is approximately as follows: 95% action 8, 3% action 16, 2% action 2 and 1% action 6.

The third characteristic behavior 406 defines a relative frequency of performance that is approximately as follows: 84% action 9, 6% action 8, 2.5% action 20, 2% action 2, 2% action 16, 1.5% action 4, 1% action 6 and 1% action 15.

The fourth characteristic behavior 408 defines a relative frequency of performance that is approximately as follows: 92% action 11, 4.5% action 8, 2% action 20 and 1.5% action 4.

The fifth characteristic behavior 410 defines a relative frequency of performance that is approximately as follows: 67% action 20, 14% action 8, 4% action 4, 4% action 9, 4% action 16, 3% action 2, 3% action 6, 1% action 11.

Referring again to FIG. 2, at 212, in the detection phase 204, the method may further include receiving, in a processor, information indicating a relative frequency at which each of the different actions was performed by a user over a period of time. Such information may have any form(s) and may be received from any source(s), directly and/or indirectly, external and/or internal to, the processor.

In some embodiments, the user is one of the plurality of users. In other embodiments, the user is not one of the plurality of users. In either case the period of time may be subsequent to the one or more periods of time, but is not required to be such.

At 214, in the detection phase 204, the method may further include determining, by a processor, a representation of the relative frequency at which each of the different actions was performed by the user over the period of time as a weighted combination of the different characteristic behaviors each of which defines a relative frequency of performance of each of the different actions.

A simplified example of a representation as a weighted combination of different characteristic behaviors is shown in Table 3. Specifically, Table 3 shows a representation of the relative frequency in Table 1 as a weighted combination of the different characteristic behaviors shown in Table 2.

TABLE 3

SIMPLIFIED EXAMPLE SHOWING REPRESENTATION OF THE RELATIVE FREQUENCY IN TABLE 1, AS A WEIGHTED COMBINATION OF THE CHARACTERISTIC BEHAVIORS IN TABLE 2

0.5 × characteristic behavior #1 + 0.5 × characteristic behavior #2

At 216, in the detection phase 202, the method may further include determining, by a processor, an error or other difference based at least in part on: (i) the relative frequency at which each of the different actions was performed by the user over the period of time and (ii) the weighted combination representing the relative frequency at which each of the different actions was performed by the user over the period of time.

In some embodiments, the above is carried out by determining a reconstruction of the weighted combination representing the relative frequency at which each of the different actions was performed by the user over the period of time, and by then determining a difference (sometimes referred to herein as a reconstruction error) between: (i) the relative frequency at which each of the different actions was performed by the user over the period of time and (ii) the reconstruction of the weighted combination representing the relative frequency at which each of the different actions was performed by the user over the period of time.

A simplified example of a reconstruction of a weighted combination representing a relative frequency at which each of different actions was performed by a user over a period of time is shown in Table 4. Specifically, Table 4 shows a reconstruction of the weighted combination in Table 3.

TABLE 4

SIMPLIFIED EXAMPLE SHOWING RECONSTRUCTION OF WEIGHTED COMBINATION IN TABLE 3

0.5 × characteristic behavior #1 + 0.5 × characteristic behavior #2 =
0.5 × (80% print file, 10% copy file, 10% email) + 0.5 × (10% print file, 10% copy file, 80% email) =
40% print file, 5% copy file, 5% email + 5% print file, 5% copy file, 40% email =
45% print file, 10% copy file, 45% email A generalized equation for the reconstruction in Table 4 is as follows:

$$(w_1 \times h_{1,1} + w_2 \times h_{2,1}), (w_1 \times h_{1,2} + w_{1,2} \times h_{2,2}), (w_1 \times h_{1,3} + w_2 \times h_{2,3})$$

where
$w_1$ is the weighting applied to characteristic behavior$_1$
$w_2$ is the weighting applied to characteristic behavior$_2$
$h_{1,1}$, $h_{1,2}$, $h_{1,3}$ is the relative frequency defined by characteristic behaviors for action$_1$, action$_2$, action$_3$
$h_{2,1}$, $h_{2,2}$, $h_{2,3}$ is the relative frequency defined by characteristic behavior$_2$ for action$_1$, action$_2$, action$_3$.

A simplified example of a difference between: (i) a relative frequency at which each of different actions was performed by a user over a period of time and (ii) reconstruction of the weighted combination representing the relative frequency at which each of the different actions was performed by the user over the period of time is shown in Table 5.

Specifically, Table 5 shows a difference (sometimes referred to herein as a reconstruction error) between the relative frequency in Table 1 and the reconstruction of the weighted combination representing the relative frequency (Table 4).

TABLE 5

DIFFERENCE BETWEEN RELATIVE FREQUENCY IN TABLE 1 AND RECONSTRUCTION OF WEIGHTED COMBINATION REPRESENTING THE RELATIVE FREQUENCY (TABLE 5)

45% print file, 10% copy file, 45% email −
45% print file, 10% copy file, 45% email = 0

Figure 6A:
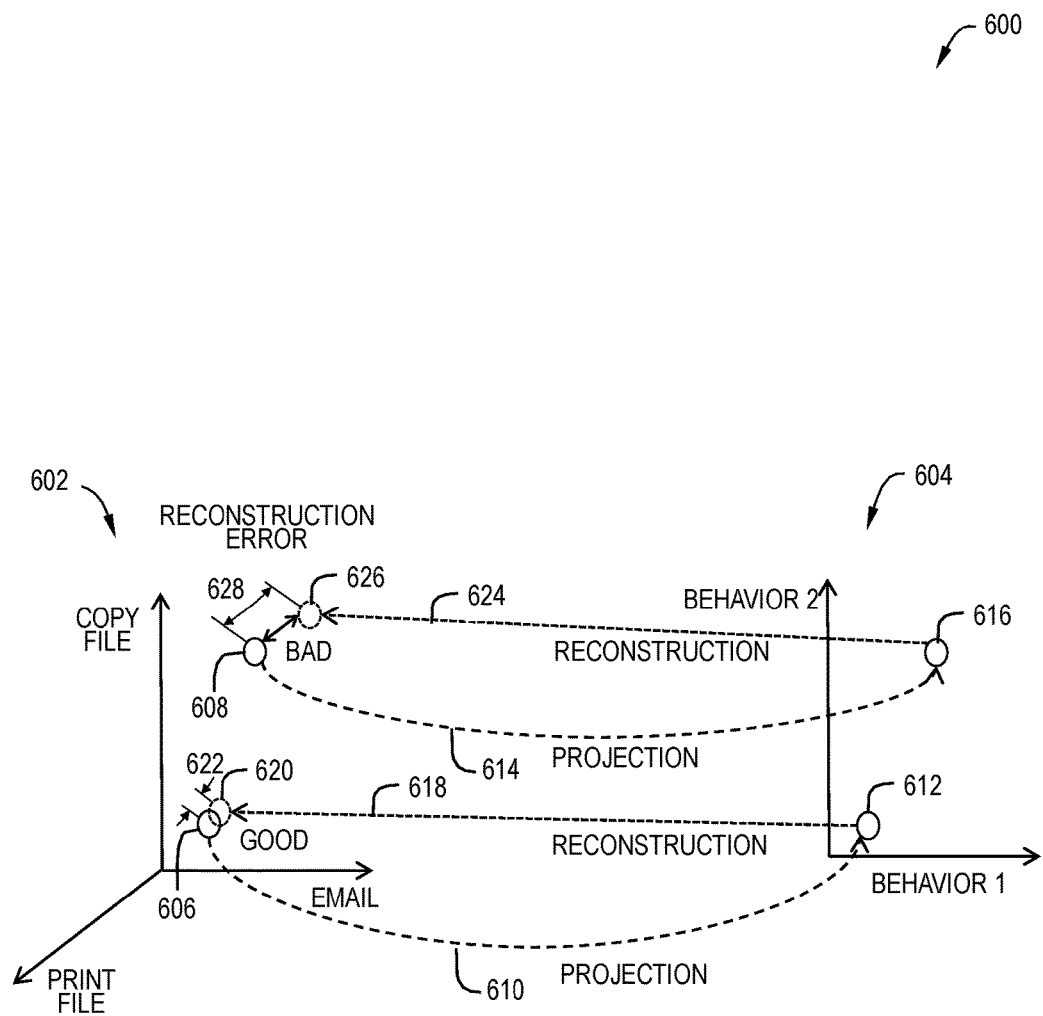
FIG. 6A is a graphical representation of a reconstruction and a reconstruction error, in accordance with some embodiments.

Thus, in the simplified example in Tables 1-5, the reconstruction error is zero. A generalized equation for the reconstruction error in Table 5 is as follows:

$$v_1 - (w_1 \times h_{1,1} + w_2 \times h_{2,1}), v_2 - (w_1 \times h_{1,2} + w_2 \times h_{2,2}), v_2 - (w_{1,1} \times h_{1,3} + w_{1,2} \times h_{2,3})$$

where
$v_1$, $v_2$, $v_3$ is the relative frequency at which the user performed action$_1$, action$_2$, action$_3$ over the time period
$w_1$ is the weight applied to characteristic behaviors
$w_2$ is the weight applied to characteristic behavior$_2$
$h_{1,1}$, $h_{1,2}$, $h_{1,3}$ is the relative frequency defined by characteristic behaviors for action$_1$, action$_2$, action$_3$
$h_{2,1}$, $h_{2,2}$, $h_{2,3}$ is the relative frequency defined by characteristic behavior$_2$ for action$_1$, action$_2$, action$_3$ FIG. 6A is a graphical representation 600 of a reconstruction and a reconstruction error, in accordance with some embodiments.

Referring to FIG. 6A, the graphical representation 600 includes two coordinate systems 602, 604. A first one of the coordinate systems 602 has three axes labeled print file, copy file and email, respectively. A first point 606 in such coordinate system 602 indicates a first relative frequency at which the print file, copy file and email actions are performed by a user over a time period. A second point 608 in such coordinate system 602 indicates a second relative frequency at which the print file, copy file and email actions are performed by a user over a time period.

The second coordinate system 604 has two axes labeled behavior 1 and behavior 2, respectively.

A first projection 610 shows the first relative frequency being projected to a first point 612 in the second coordinate system 604, which represents a first weighted combination of behavior 1 and behavior 2.

A second projection 614 shows the first relative frequency being projected to a second point 616 in the second coordinate system 604, which represents a second weighted combination of behavior 1 and behavior 2.

A first reconstruction 618 indicates that the first weighted combination of behavior 1 and behavior 2 reconstructs to a third point 620 in the first coordinate system 602, which represents a third relative frequency of performance of the print file, copy file and email actions, which differs from the first relative frequency by a first reconstruction error 622.

A second reconstruction 624 indicates that the second weighted combination of behavior 1 and behavior 2 reconstructs to a fourth point 626 in the first coordinate system 602, which represents a fourth relative frequency of performance of the print file, copy file and email actions, which differs from the second relative frequency by a second reconstruction error 628.

The first reconstruction error 622 is small (compared to the second reconstruction error 628) and thus may be considered "good" (compared to the second reconstruction error 628).

On the other hand, the second reconstruction error 628 is large (compared to the first reconstruction error 622) and thus may be considered "bad" (compared to the first reconstruction error 622).

Referring again to FIG. 2, at 218, in the detection phase 202, the method may further include comparing, by a processor, the difference to a criteria.

As used herein, the term "comparing" means comparing directly and/or comparing indirectly. Thus, in some embodiments, the difference itself may be compared directly to a criteria. In some other embodiments, the difference may transformed and the comparison may be performed indirectly by comparing the transformed difference to a criteria.

Any type of criteria may be used. In some embodiments, the criteria is in the form of a threshold. If the difference is in the form of a reconstruction error, the threshold may be chosen (and/or otherwise defined) such that a reconstruction error less than the threshold indicates normal behavior, and a reconstruction error greater than the threshold indicates suspicious (and/or other anomalous) behavior. In some embodiments, the threshold may be chosen (and/or otherwise defined) by an analyst and/or other user.

Some comparisons may involve statistics. In such embodiments, an analyst and/or other user may specify (and/or otherwise define) a level of confidence (sometimes referred to herein as a desired level of confidence) that must be satisfied if a user's behavior is to be identified as suspicious (and/or otherwise anomalous). Statistics may be used to determine a threshold that corresponds to the desired level of confidence. For example, if an analyst specifies a 95% level of confidence, statistics may be used to determine a threshold that corresponds to a 95% level of confidence. The reconstruction error or other difference may then be compared to such threshold.

Any suitable statistics may be used. In some embodiments, the statistics may be based at least in part on a distribution of prior reconstruction errors for the user and/or for a plurality of users.

As will be further discussed below, a plurality of reconstruction errors are determined in the process of determining the plurality of different characteristic behaviors at 210 (FIG. 2). In such embodiments, a statistical distribution of those reconstruction errors may be used.

Some embodiments may use all of the reconstruction errors that are determined in the process of determining the plurality of different characteristic behaviors at 210 (FIG. 2). Some other embodiments may use only the reconstruction errors that were associated with the particular user, if any such reconstruction errors exist.

If the historical information is specific to a user, it can be used to determine an amount by which the user's behavior has changed and/or a likelihood that such amount of change would occur given the user's history, so as to help identify potentially suspicious (and/or otherwise anomalous) behavior and/or to help prevent data loss. If the historical information is not specific to the user, it can be used to determine a likelihood that the user's behavior is normal given the history of all users associated with the historical reconstruction errors, so as to help identify potentially suspicious (and/or otherwise anomalous) behavior and/or to help prevent data loss.

In some embodiments, the detection phase 204 is repeated for each of a plurality of users and/or for each of a plurality of periods of time. In some embodiments, the information received at 212 is indicative of a relative frequency at which each of the different actions was performed by each of a plurality of users over each of a plurality of time periods, and 214-218 are performed for each user-time period combination in the information.

The results of the detection phase may be provided to a graphical user interface.

Thus, at 220, the method may further include displaying, based at least in part on the comparison, a result indicating whether anomalous behavior is detected on the part of the user.

In some embodiments, any results that may be provided to a graphical user interface may also be provided to a printer and/or any other type of output device.

Figure 6B:
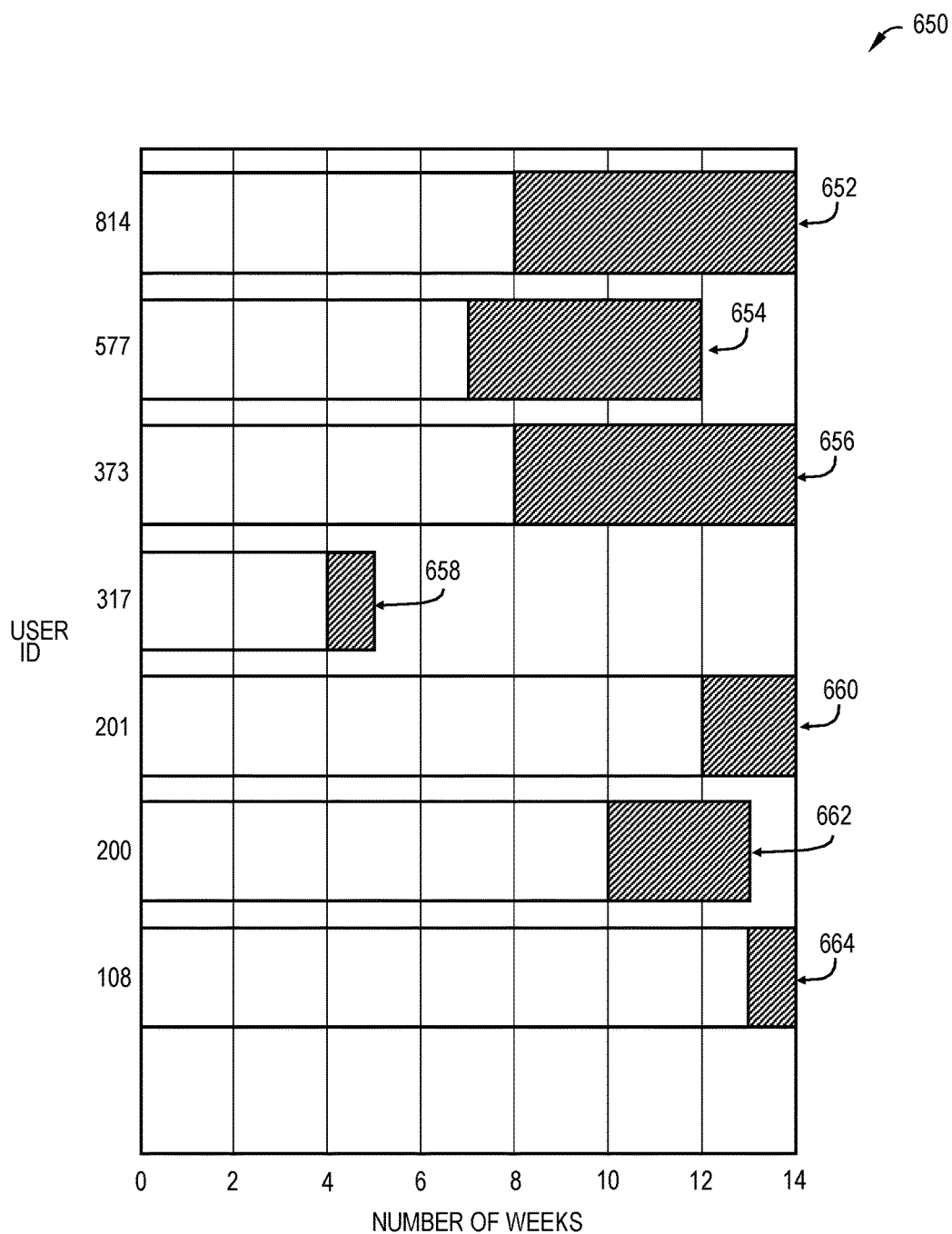
FIG. 6B is a view in a graphical user interface, in accordance with some embodiments.

FIG. 6B is a view 650 in a graphical user interface, in accordance with some embodiments.

Referring to FIG. 6B, in accordance with some embodiments, the view 650 may include a bar chart (and/or other graphical or not graphical visualization) that indicates results from the detection phase, in accordance with some embodiments.

In some embodiments, the bar chart (and/or other type of visualization) identifies each of a plurality of users that the detection phase determined had suspicious and/or other anomalous behavior over at least one period of time, which could potentially lead to data loss.

In the illustrated embodiment, the bar chart includes a plurality of bars, e.g., bars 652-664. Each of the bars is associated with a respective one of a plurality of users that the detection phase determined had suspicious and/or other anomalous behavior over at least one period of time.

The bar chart (and/or other graphical or not graphical visualization) may also provide further details. In some embodiments, the bar chart (and/or other graphical or not graphical visualization) may indicate the number of time periods that each identified users had suspicious and/or other anomalous behavior as well as the number of time periods that each of the identified users had behavior that was determined not suspicious and/or otherwise anomalous.

In that regard, in the illustrated embodiment, each of the bars, e.g., bars 652-664, is divided into two portions. The first portion (shown without fill) indicates the number of time periods for which the behavior of the associated user was not determined to be suspicious and/or otherwise anomalous. The second portion (shown cross hatched) indicates the number of time periods for the behavior of the user was determined to be suspicious and/or otherwise anomalous.

For example, a first portion of the first bar 652 indicates that a user having a user ID 814 had behavior that was not determined to be suspicious and/or otherwise anomalous over eight periods of time. The second portion of the first bar 652 indicates that the user had behavior that was determined to suspicious and/or otherwise anomalous over 6 periods of time.

In some embodiments, the graphical user interface may allow a user to drill down into the results.

FIG. 6C is a view 670 in a graphical user interface that allows a user to drill down, in accordance with some embodiments.

Referring to FIG. 6C, the view 670 includes further details regarding the results for one of the users that the detection phase determined had suspicious and/or other anomalous behavior over at least one period of time.

In some embodiments, the view 670 may be provided in response to a request (e.g., via mouse click) from a user of the graphical user interface. In some embodiments, such request may be in the form of a mouse click on a bar, e.g., bar 656, that is associated with one of the users, e.g., user 373, for which the detection phase determined had suspicious and/or other anomalous behavior over at least one period of time.

In the illustrated embodiment, the view includes two graphical representation 672, 674. Each graphical representation includes a plurality of curves, e.g., 676-680 and 682-686, respectively. Each curve is associated with one period of time and indicates a relative frequency at which the user, e.g., user 373, performed each of the plurality of actions during the one period of time. The representation 672 indicates the relative frequency in a non-normalized form. The representation 674 indicates the relative frequency in a normalized form. Thus, the graphical representations 672, 674 provide the same information but in different forms.

The relative frequencies shown in graphical representations 672, 674 are for periods of time that the detection phase determined had suspicious and/or other anomalous behavior.

Similar graphical representations may provide details for periods of time that the detection phase determined the did not have suspicious and/or other anomalous behavior.

FIG. 6D is a view 690 in a graphical user interface, in accordance with some embodiments.

Referring to FIG. 6D, in accordance with some embodiments, the view 690 includes graphical representations 692, 694 that provide details for periods of time that the detection phase determined the user did not have suspicious and/or other anomalous behavior.

In some embodiments, the view includes a textual or other explanation that informs the user of the reason for flagging the suspicious and/or anomalous behavior. In some embodiments, the explanation may indicate that the relative frequency at which one or more of the different actions was performed by one or more of the plurality of users over one or more of the one or more periods was too high or too low. In the illustrated embodiments, the textual explanation may inform the user that the relative frequency of action 7 (file delete) is high and not accompanied by a comparably high relative frequency of other file operations (e.g., file rename, file move, etc.).

In some embodiments, each of the graphical representations 672, 674, 692, 694 may be provide in a single view (i.e., a same view) to make it easier for a user of the graphical user interface to make a comparison.

Table 6 provides a summary of performance characteristics that may be provided by a model determination phase and a detection phase, in accordance with some embodiments.

TABLE 6

| Type of Tracking | Each Occurrence of Each Different Action Logged in Time-Stamped Log Entry |
| --- | --- |
| Number of Different Types of Actions | 36 (e.g., File Open, File Move, File Copy, File Delete, File Rename, Network Transfer Upload, File Print, Email, etc.) |
| Total Number of Log Entries | >40 Million Time-Stamped Log Entries |
| Total Amount of Information That Is Received | >7 Gigabyte |
| Length of Each Time Period | 1 Week |
| Total Number of User-Time Periods Combinations | >5500 (User-Weeks) |
| Time to Convert Total Number of Log Entries into Aggregated User-Time Period Records | Approximately 5 Minutes Using APPLE MACBOOK PRO with INTEL CORE i7, 8 GB RAM |
| Time to Determine Model | Approximately 5 Minutes |
| Time to Apply Model and Identity Users Having Anomalous Behavior | Approximately 10 Seconds |

As stated above, and as will be further discussed below, non-negative matrix factorization and/or other iterative method(s) may be used in determining the plurality of different characteristic behaviors.

It has been determined that the accuracy at which the model represents the behavior within an entity can be improved by increasing the number of characteristic behaviors that are included in the plurality of characteristic behaviors.

However, the number of characteristic behaviors represents a trade-off between accuracy and complexity. Increasing the number may improve accuracy, however it may also increases complexity and/or the amount of time needed to detect suspicious and/or other anomalous behavior. The effects of the latter become magnified in embodiments that must analyze the behavior of large numbers of users.

In some instances, it may be possible to employ an analyst to try to select a number that represents a reasonable compromise.

However, in some embodiments, that may not be a desirable option or an option at all.

It has been determined that it is possible to determine a number of characteristic behaviors that strikes a reasonable balance between accuracy, complexity and speed.

In accordance with some embodiments, the number may be determined without human supervision.

Figure 7A:
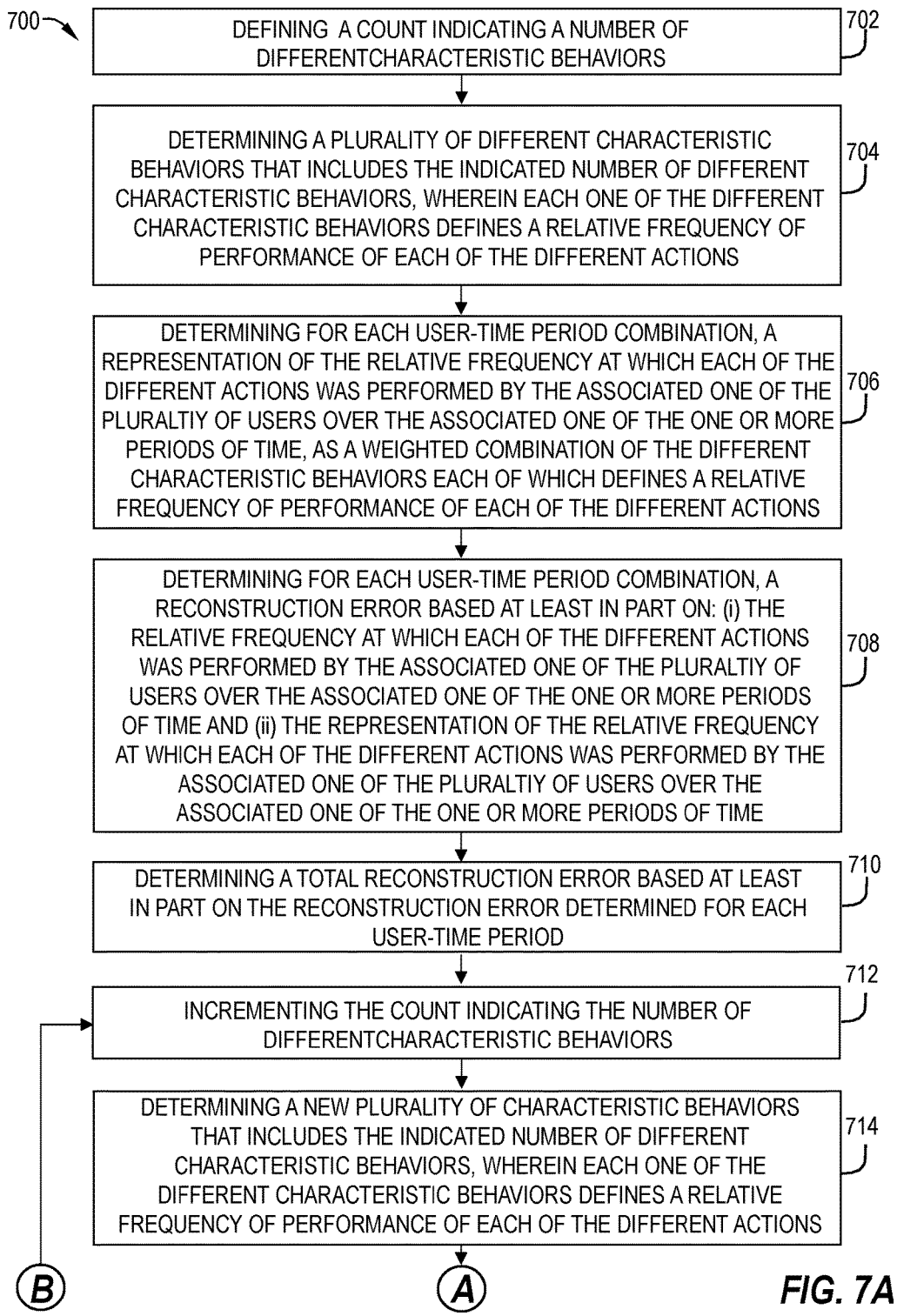
FIGS. 7A-7B are a flowchart of a method, in accordance with some embodiments.
Figure 7B:
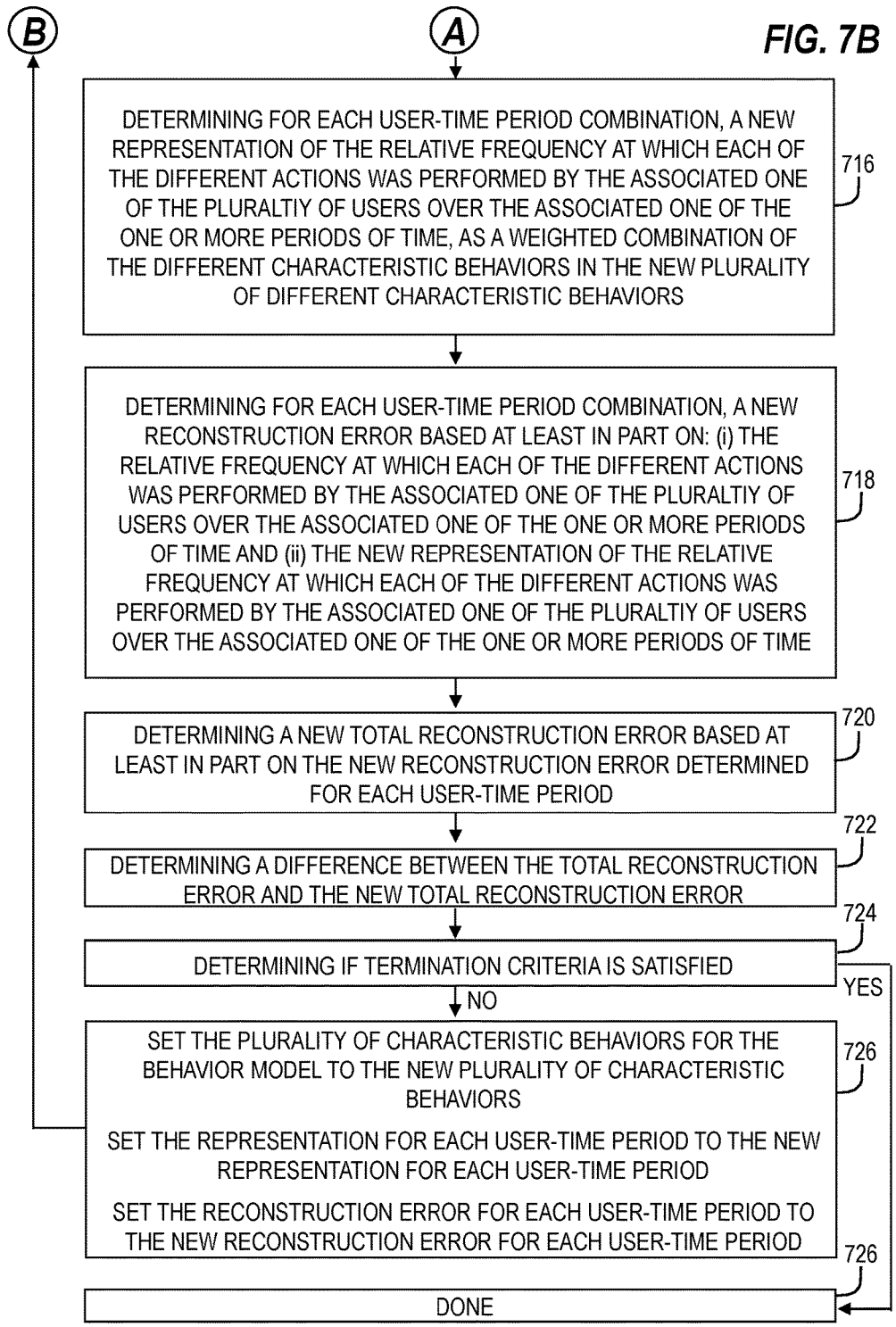

FIGS. 7A-7B illustrate a flow chart of a method 700 that may be used in determining the plurality of different characteristic behaviors at 210 (FIG. 2), in accordance with some embodiments.

Referring to FIGS. 7A-7B, at 702, the method may include defining a count indicating a number (e.g., an initial number) of different characteristic behaviors to include in a plurality of different characteristic behaviors for a behavior model.

At 704, the method may further include determining a plurality of different characteristic behaviors that includes the indicated number of different characteristic behaviors, based at least in part on the information indicating the relative frequency at which each of the different actions was performed by each of the plurality of users over each of one or more periods of time, wherein each one of the different characteristic behaviors defines a relative frequency of performance of each of the different actions.

In some embodiments, non-negative matrix factorization and/or other iterative method may be used in determining the plurality of different characteristic behaviors at 704.

As stated above, an iterative method may determine multiple sets of characteristic behaviors. Each set may be characterized as to its accuracy. A set that results in less error than the others may be selected for use as the plurality of characteristic behaviors. In some embodiments, a set of characteristic behaviors that results in less error than others may do so by more effectively "capturing" any underlying relationships that exist in the information.

At 706, the method may further include determining for each user-time period combination, a representation of the relative frequency at which each of the different actions was performed by the associated one of the plurality of users over the associated one of the one or more periods of time, as a weighted combination of the different characteristic behaviors each of which defines a relative frequency of performance of each of the different actions.

FIG. 8A is a graphical representation 800 of representations that may be determined at 704, in accordance with some embodiments.

Referring to FIG. 8A, in accordance with some embodiments, the graphical representation 800 includes a table having a plurality of entries 802-830.

Each entry identifies a user-time period combination and includes a representation of the relative frequency at which each of the different actions was performed by the one of the plurality of users over the one of the one or more periods of time, as a weighted combination of the different characteristic behaviors each of which defines a relative frequency of performance of each of the different actions.

For example, an entry 802 indicates that for a user-time period combination associated with the week Nov. 3, 2013-Nov. 9, 2013 and the user having user ID 001, the weight associated with characteristic behavior 1 is, the weight associated with characteristic behavior 2 is $w_{1,1,2}$, the weight associated with characteristic behavior 3 is $w_{1,1,3}$, and so on.

An entry 804 indicates that for the user-time period combination associated with the week Nov. 10, 2013-Nov. 16, 2013 and the user having user ID 001, the weight associated with characteristic behavior 1 is $w_{1,2,1}$, the weight associated with characteristic behavior 2 is $w_{1,2,2}$, the weight associated with characteristic behavior 3 is $w_{1,2,3}$, and so on.

Referring again to FIGS. 7A-7B, at 708, the method may further include determining for each user-time period combination, a reconstruction error based at least in part on: (i) the relative frequency at which each of the different actions was performed by the associated one of the plurality of users over the associated one of the one or more periods of time and (ii) the representation of the relative frequency at which each of the different actions was performed by the associated one of the plurality of users over the associated one of the one or more periods of time.

FIG. 8B is a graphical representation 850 of reconstruction errors that may be determined at 706, in accordance with some embodiments.

Referring to FIG. 8B, in accordance with some embodiments, the graphical representation 850 includes a table having a plurality of entries 852-880.

Each entry identifies a user-time period combination and includes a representation of a reconstruction error based at least in part on: (i) the relative frequency at which each of the different actions was performed by the associated one of the plurality of users over the associated one of the one or more periods of time and (ii) the representation of the relative frequency at which each of the different actions was performed by the associated one of the plurality of users over the associated one of the one or more periods of time.

For example, an entry 852 indicates that for a user-time period combination associated with the week Nov. 3, 2013-Nov. 9, 2013 and the user having user ID 001, the reconstruction error has a component $e_{1,1,1}$, with respect to action 1, a component $e_{1,1,2}$, with respect to action 2, a component $e_{1,1,3}$ with respect to action 3, and so on.

An entry 804 indicates that for the user-time period combination associated with the week Nov. 10, 2013-Nov. 16, 2013 and the user having user ID 001, the reconstruction error has a component with respect to action 1, a component $e_{1,1,2}$, with respect to action 2, and a component with respect to action 3, and so on. In some embodiments, one or more portions of the reconstruction errors may be used as a statistical distribution to determine a likelihood that a particular reconstruction error indicates suspicious (and/or otherwise anomalous) behavior.

As stated above, in such embodiments, an analyst and/or other user may specify (and/or otherwise define) a level of confidence (sometimes referred to herein as a desired level of confidence) that must be satisfied if a user's behavior is to be identified as suspicious (and/or otherwise anomalous). Statistics may be used to determine a threshold that corresponds to the desired level of confidence. For example, if an analyst specifies a 95% level of confidence, statistics may be used to determine a threshold that corresponds to a 95% level of confidence. The reconstruction error or other difference may then be compared to such threshold.

In some embodiments, the statistics may be based at least in part on a distribution of prior reconstruction errors for the user and/or for a plurality of users.

Some embodiments may use all the reconstruction errors that are determined in the process of determining the plurality of different characteristic behaviors at 210 (FIG. 2). Some embodiments may use only the reconstruction errors that were associated with the particular user, if any such reconstruction errors exist.

If the historical information is specific to a user, it can be used to determine an amount by which the user's behavior has changed and/or a likelihood that such amount of change would occur given the user's history, so as to help identify potentially suspicious (and/or otherwise anomalous) behavior and/or to help prevent data loss. If the historical information is not specific to the user, it can be used to determine a likelihood that the user's behavior is normal given the history of all users in the historical information, so as to help identify potentially suspicious (and/or otherwise anomalous) behavior and/or to help prevent data loss.

Referring again to FIGS. 7A-7B, at 710, the method may further include determining a total reconstruction error based at least in part on the reconstruction error determined for each user-time period combination.

In some embodiments, a total reconstruction error is determined as follows:

$$\text{total reconstruction error} = \|V - WH\|$$

where
V is an N×M user-week (or other time period) data matrix,
W is an N×R projections matrix of weights, and
H is an R×M matrix of characteristic user behaviors.

At 712, the method may further include incrementing the count indicating the number of different characteristic behaviors.

At 714, the method may further include determining a new plurality of different characteristic behaviors that includes the indicated number of different characteristic behaviors, based at least in part on the information indicating the relative frequency at which each of the different actions was performed by each of the plurality of users over each of one or more periods of time, wherein each one of the different characteristic behaviors in the new plurality of different characteristic behaviors defines a relative frequency of performance of each of the different actions.

In some embodiments, non-negative matrix factorization and/or other iterative method may be used in determining the new plurality of different characteristic behaviors at 714.

At 716, the method may further include determining for each user-time period combination, a new representation of the relative frequency at which each of the different actions was performed by the associated one of the plurality of users over the associated one of the one or more periods of time, as a weighted combination of the different characteristic behaviors in the new plurality of different characteristic behaviors.

At 718, the method may further include determining for each user-time period combination, a new reconstruction error based at least in part on: (i) the relative frequency at which each of the different actions was performed by the associated one of the plurality of users over the associated one of the one or more periods of time and (ii) the new representation of the relative frequency at which each of the different actions was performed by the associated one of the plurality of users over the associated one of the one or more periods of time.

At 720, the method may further include determining a new total reconstruction error based at least in part on the new reconstruction error determined for each user-time period combination.

At 722, the method may further include determining a difference between the total reconstruction error and the new total reconstruction error.

At 724, the method may further include determining whether a termination criteria is satisfied.

In some embodiments, determining whether a termination criteria is satisfied may comprise determining whether the difference between the total reconstruction error and the new total reconstruction error satisfies a threshold. In some embodiments, the threshold may be chosen (and/or otherwise defined) such that a difference greater than the threshold indicates that the termination criteria is not yet satisfied, and that a difference less than the threshold indicates that the termination criteria is satisfied.

In some embodiments, the threshold may be chosen and/or otherwise defined such the number of different characteristic behaviors in the plurality of different characteristic behaviors will be at and/or near a knee in a relationship between the total reconstruction error and the number of different characteristic behaviors in plurality of characteristic behaviors.

Figure 8C:
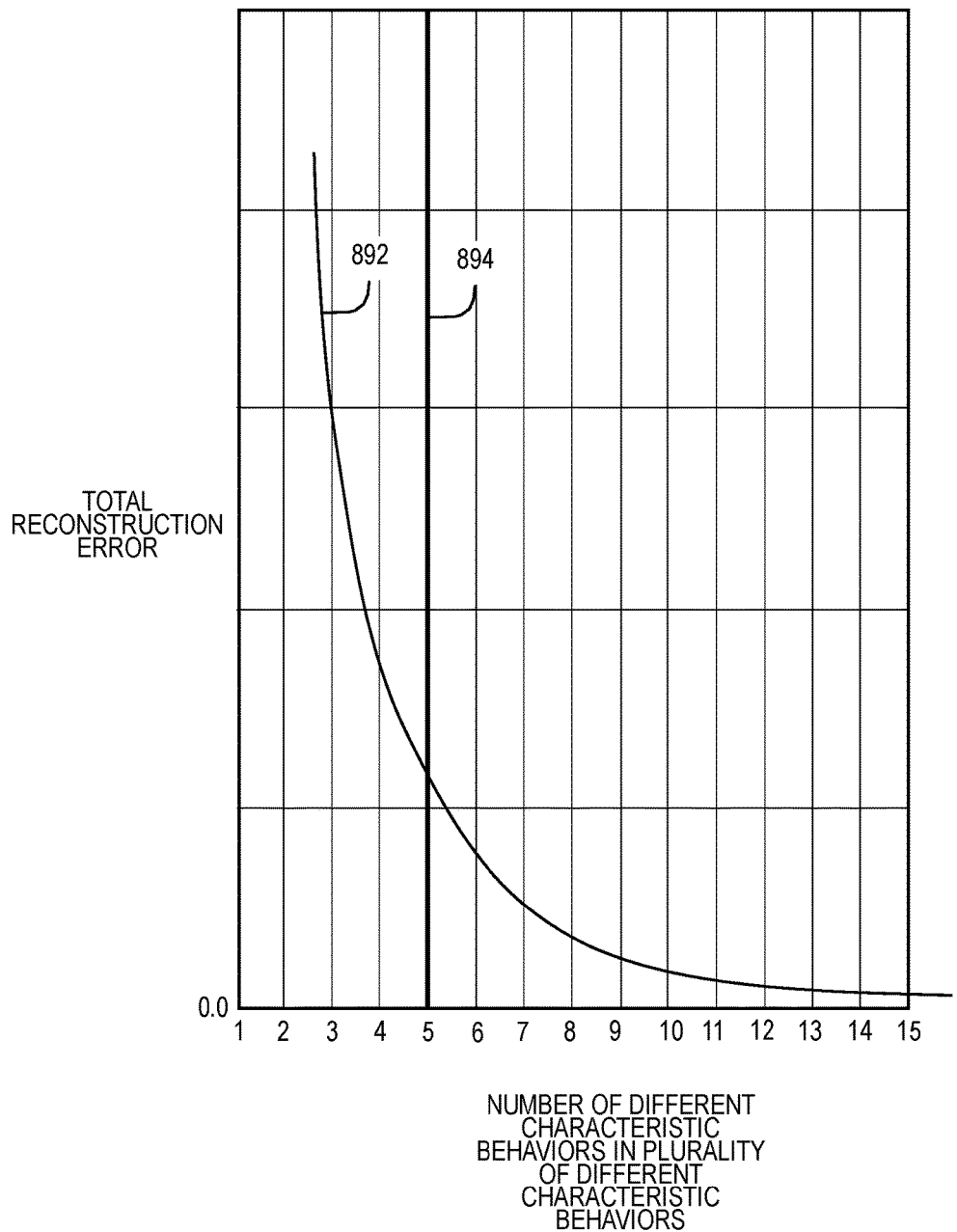
FIG. 8C is a graphical representation of a hypothetical relationship that may exist between the total reconstruction error and the number of different characteristic behaviors in plurality of characteristic behaviors, in accordance with some embodiments.

FIG. 8C is a graphical representation 890 that includes a curve 892 showing a hypothetical relationship that may exist between the total reconstruction error and the number of different characteristic behaviors in plurality of characteristic behaviors, in accordance with some embodiments.

Referring to FIG. 8C, in accordance with some embodiments, the threshold may be chosen and/or otherwise defined such that the number of different characteristic behaviors in the plurality of different characteristic behaviors will be a number that is at and/or near the knee in the relationship. In the illustrated embodiment, a line 894 identifies a number of different characteristic behaviors (e.g., 5) that is at and/or near the knee in the relationship.

Referring again to FIGS. 7A-7B, if the termination criteria is not satisfied, at 726, the method may further include setting the plurality of characteristic behaviors for the behavior model to the new plurality of characteristic behaviors, setting the representation for each user-time period to the new representation for each user-time period, setting the reconstruction error for each user-time period to the new reconstruction error for each user-time period, returning to 712 and repeating 712-724.

If the termination criteria is satisfied, the method may end at 728. In some embodiments, at 928, the method may further include, prior to ending, setting the plurality of characteristic behaviors for the behavior model to the new plurality of characteristic behaviors, setting the representation for each user-time period to the new representation for each user-time period, setting the reconstruction error for each user-time period to the new reconstruction error for each user-time period.

As stated above, and as will be further discussed below, non-negative matrix factorization and/or other iterative method(s) may be used in determining the plurality of different characteristic behaviors.

A set of characteristic behaviors that results in lower total error than others may do so by "capturing" underlying relationships that may exist in the information.

However, it has been determined that, in at least some embodiments, it may be undesirable to capture underlying relationships that are in the information but abnormal the entity.

In other words, In that regard, it has been determined that the ability to identify suspicious (and/or otherwise anomalous) behavior may be improved by identifying outliers in the information and by determining a new set of characteristic behaviors that do not capture relationships in the outliers. In accordance with some embodiments, the new characteristic behaviors may be better suited to represent normal behavior, and less suited to representing suspicious (and/or otherwise anomalous) behavior.

Without the outliers, normal behavior may end up represented with less error, and suspicious (and/or otherwise anomalous) behavior may end up represented with greater error.

Since suspicious (and/or otherwise anomalous) behavior may be detected by comparing the error to a threshold, increasing the amount of error in the case of suspicious and/or other anomalous behavior has the effect of making it easier to detect suspicious and/or other anomalous behavior.

Figure 9A:
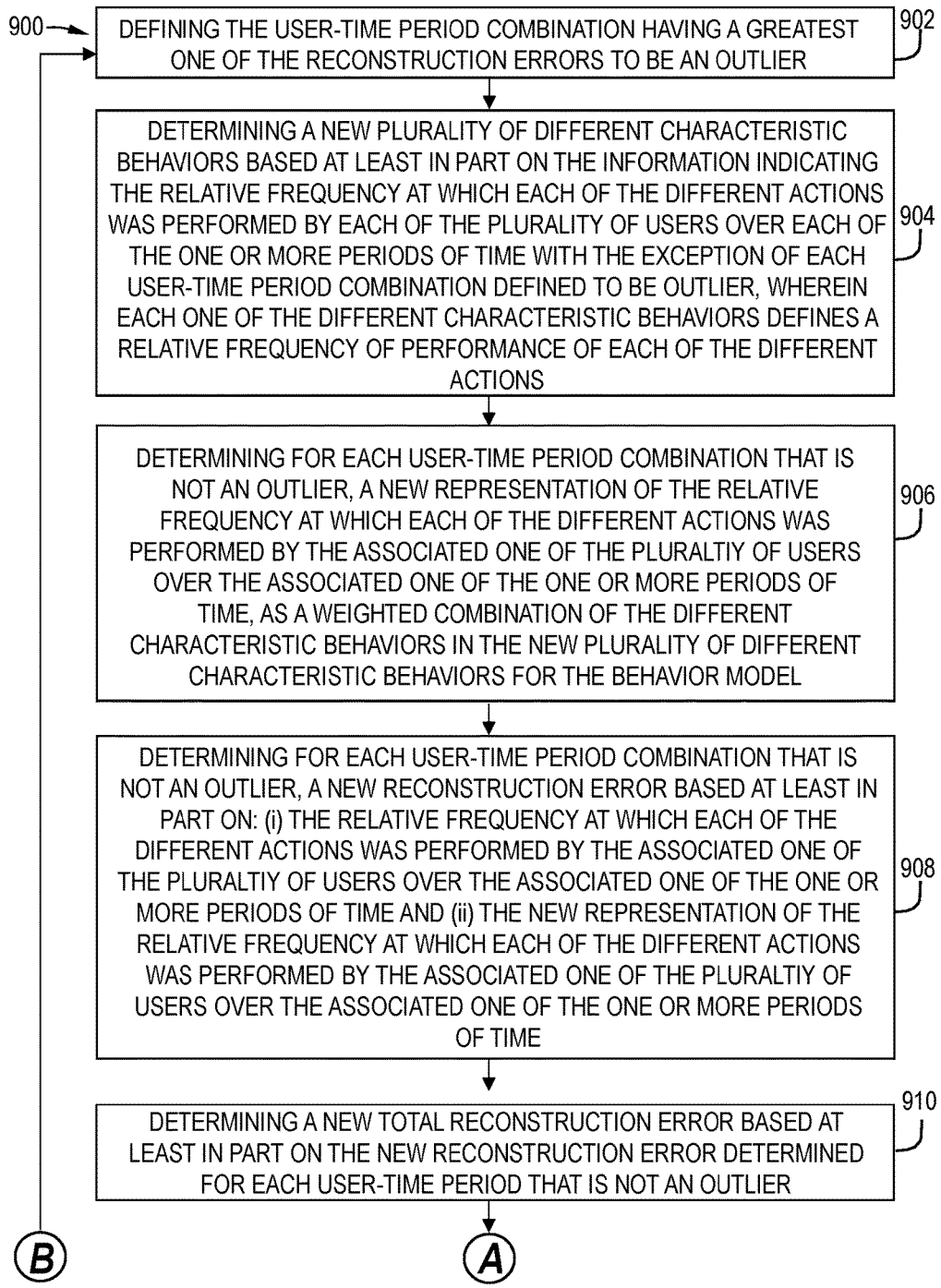
FIGS. 9A-9B are a flowchart of a method, in accordance with some embodiments.
Figure 9B:
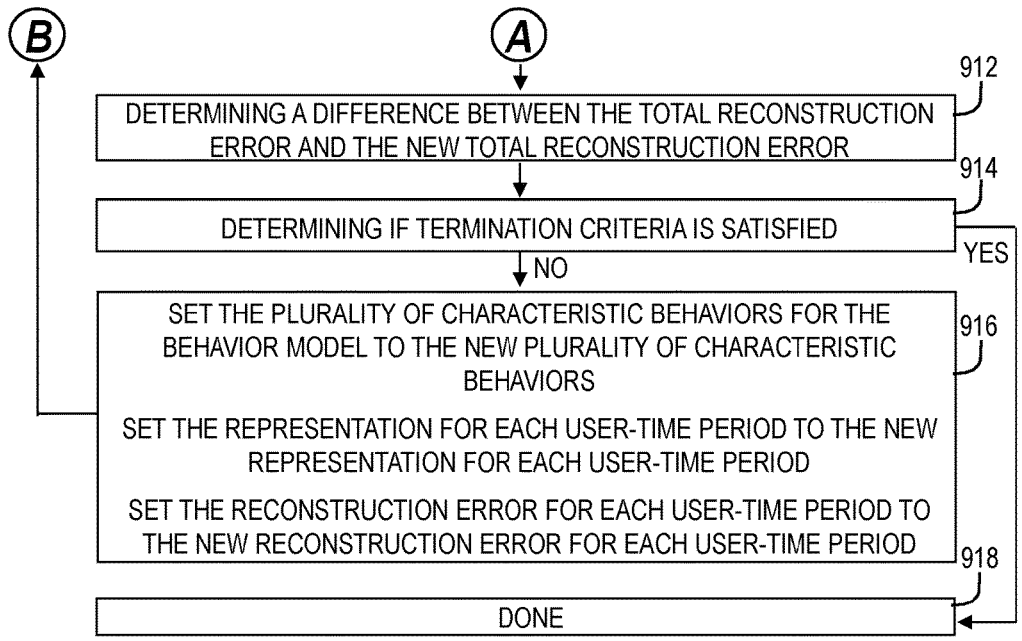

FIGS. 9A-9B are a flow chart of a method 900 that may be used in defining outliers and determining a new plurality of different characteristic behaviors, in accordance with some embodiments.

Referring to FIGS. 9A-9B, at 902, the method may include defining the user-time period combination having a greatest one of the reconstruction errors to be an outlier.

At 904, the method may further include determining a new plurality of different characteristic behaviors for the behavior model, based at least in part on the information indicating the relative frequency at which each of the different actions was performed by each of the plurality of users over each of one or more periods of time with the exception of each user-time period combination defined to be an outlier, wherein each one of the different characteristic behaviors in the new plurality of different characteristic behaviors defines a relative frequency of performance of each of the different actions.

In some embodiments, non-negative matrix factorization and/or other iterative method may be used in determining the plurality of different characteristic behaviors at 904. As stated above, an iterative method may determine multiple sets of characteristic behaviors. Each set may be characterized as to its accuracy. A set that results in less error than the others may be selected for use as the plurality of characteristic behaviors. In some embodiments, a set of characteristic behaviors that results in less error than others may do so by more effectively "capturing" any underlying relationships that exist in the information.

At 906, the method may further include determining for each user-time period combination that is not an outlier, a new representation of the relative frequency at which each of the different actions was performed by the associated one of the plurality of users over the associated one of the one or more periods of time, as a weighted combination of the different characteristic behaviors in the new plurality of different characteristic behaviors each of which defines a relative frequency of performance of each of the different actions.

At 908, the method may further include determining for each user-time period combination that is not an outlier, a new reconstruction error based at least in part on: (i) the relative frequency at which each of the different actions was performed by the associated one of the plurality of users over the associated one of the one or more periods of time and (ii) the new representation of the relative frequency at which each of the different actions was performed by the associated one of the plurality of users over the associated one of the one or more periods of time.

At 910 the method may further include determining a new total reconstruction error based at least in part on the new reconstruction error determined for each user-time period combination that is not an outlier.

At 912, the method may further include determining a difference between the total reconstruction error and the new total reconstruction error.

At 914, the method may further include determining whether a termination criteria is satisfied.

In some embodiments, determining whether a termination criteria is satisfied may comprise determining whether the difference between the total reconstruction error and the new total reconstruction error satisfies a threshold. In some embodiments, the threshold may be chosen (and/or otherwise defined) such that a difference greater than the threshold indicates that the termination criteria is not yet satisfied, and that a difference less than the threshold indicates that the termination criteria is satisfied.

In some embodiments, determining whether a termination criteria is satisfied may comprise determining a change and/or other difference between the plurality of characteristic behaviors for the behavior model to the new plurality of characteristic behaviors and then determining whether the change and/or other difference satisfies a threshold and/or other termination criteria. In some embodiments, the threshold may be chosen (and/or otherwise defined) such that a difference greater than the threshold indicates that the termination criteria is not yet satisfied, and that a difference less than the threshold indicates that the termination criteria is satisfied.

If the termination criteria is not satisfied, the method may further include setting the plurality of characteristic behaviors for the behavior model to the new plurality of characteristic behaviors, setting the representation for each user-time period to the new representation for each user-time period, setting the reconstruction error for each user-time period to the new reconstruction error for each user-time period, returning to 902 and repeating 902-914.

If the termination criteria is satisfied, the method may end at 918. In some embodiments, at 918, the method may further include, prior to ending, setting the plurality of characteristic behaviors for the behavior model to the new plurality of characteristic behaviors, setting the representation for each user-time period to the new representation for each user-time period, setting the reconstruction error for each user-time period to the new reconstruction error for each user-time period.

Figure 10A:
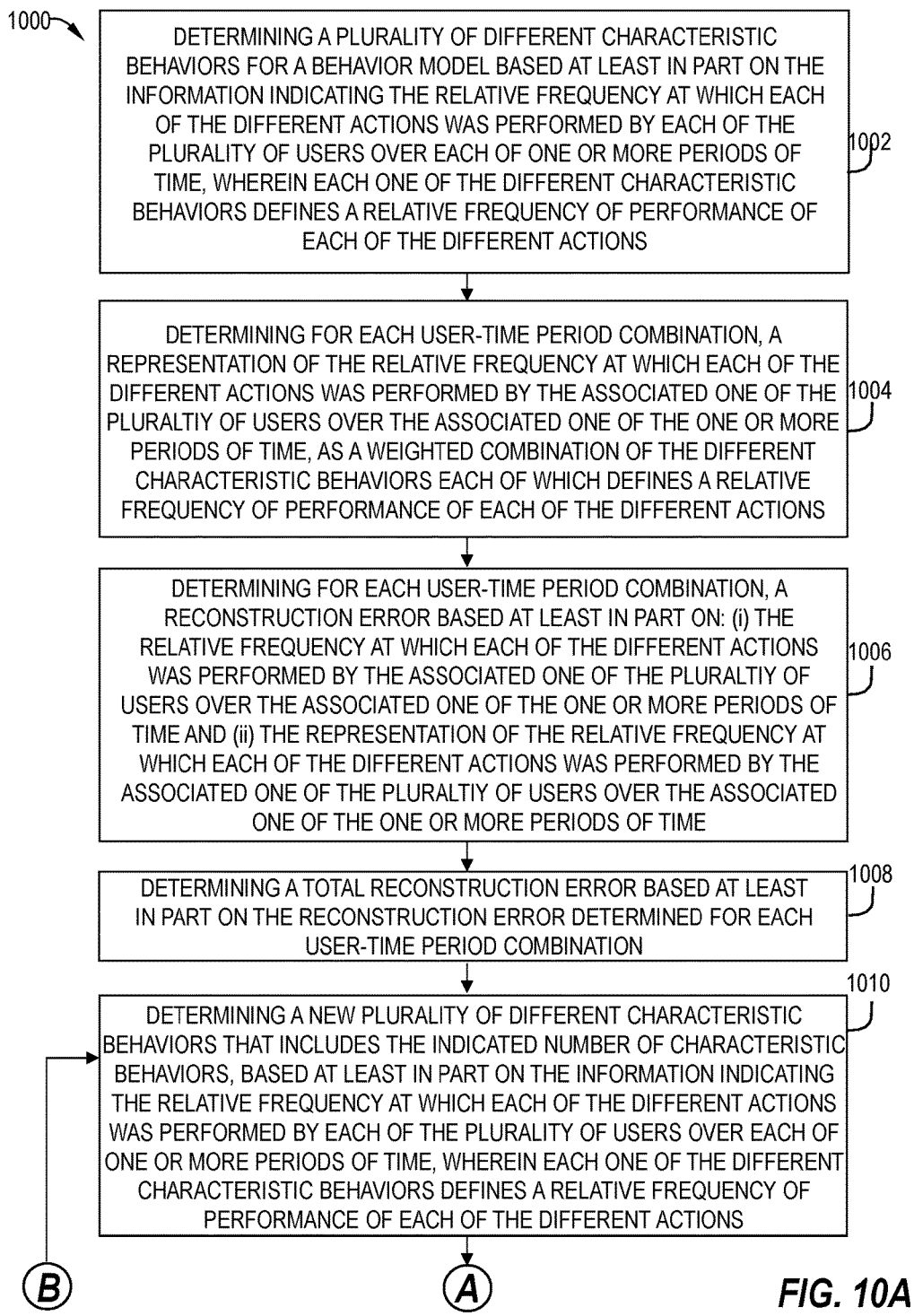
FIGS. 10A-10B are a flowchart of a method, in accordance with some embodiments.
Figure 10B:
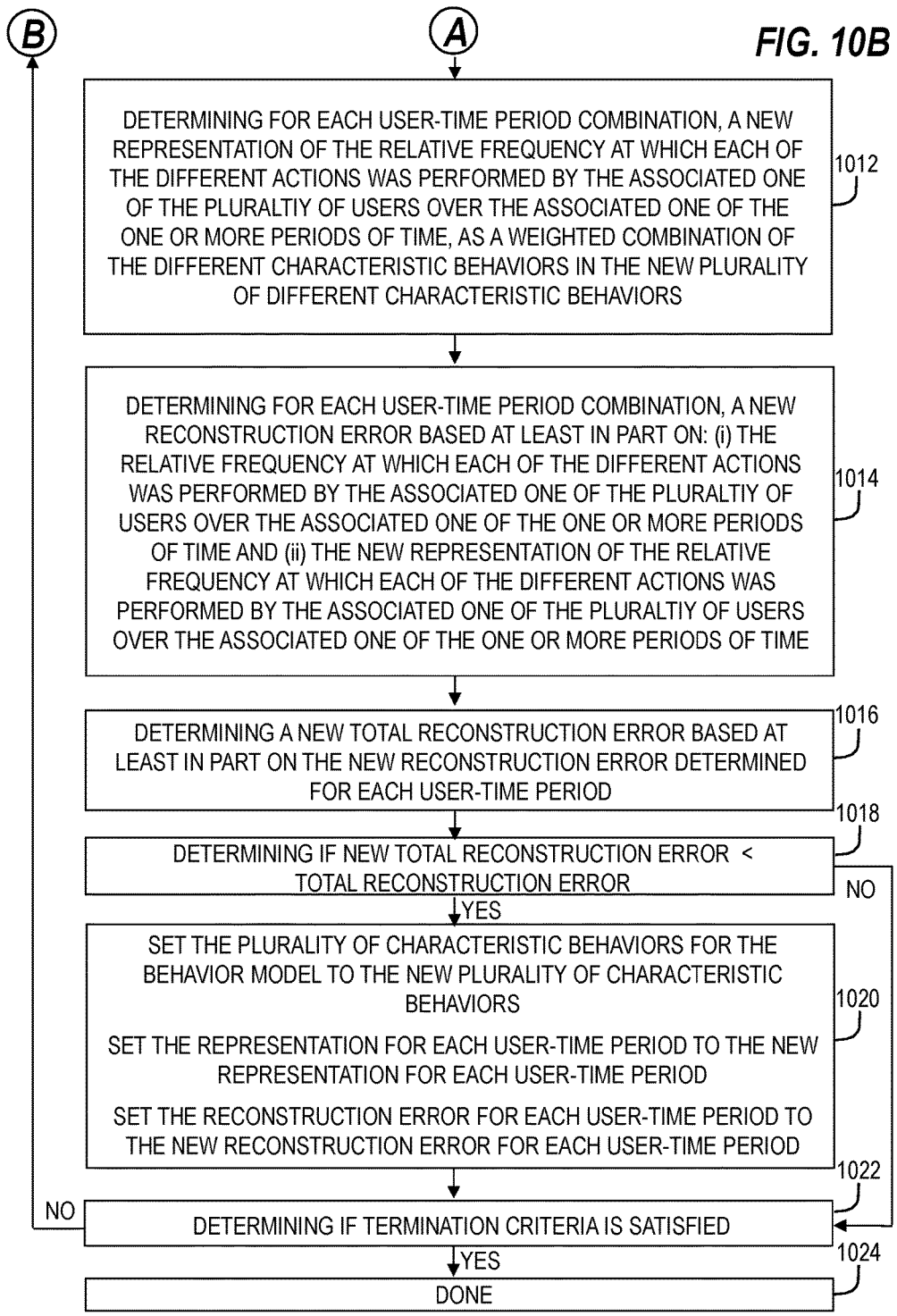

FIGS. 10A-10B illustrate a flow chart of an method 1000 that may be carried out by non-negative matrix factorization and/or another iterative method and used in determining a plurality of different characteristic behaviors and/or a new plurality of different characteristic behaviors.

In accordance with some embodiments, the method may be used in determining a plurality of different characteristic behaviors and/or a new plurality of different characteristic behaviors in the method 200, the method 700 and/or the method 1000.

Referring to FIGS. 10A-10B, at 1002, the method may include determining a plurality of different characteristic behaviors based at least in part on the information indicating the relative frequency at which each of the different actions was performed by each of the plurality of users over each of one or more periods of time, wherein each one of the different characteristic behaviors defines a relative frequency of performance of each of the different actions.

At 1004, the method may further include determining for each user-time period combination, a representation of the relative frequency at which each of the different actions was performed by the associated one of the plurality of users over the associated one of the one or more periods of time, as a weighted combination of the different characteristic behaviors each of which defines a relative frequency of performance of each of the different actions.

At 1006, the method may further include determining for each user-time period combination, a reconstruction error based at least in part on: (i) the relative frequency at which each of the different actions was performed by the associated one of the plurality of users over the associated one of the one or more periods of time and (ii) the representation of the relative frequency at which each of the different actions was performed by the associated one of the plurality of users over the associated one of the one or more periods of time.

At 1008, the method may further include determining a total reconstruction error based at least in part on the reconstruction error determined for each user-time period combination.

At 1010, the method may further include determining a new plurality of different characteristic behaviors based at least in part on the information indicating the relative frequency at which each of the different actions was performed by each of the plurality of users over each of one or more periods of time, wherein each one of the different characteristic behaviors defines a relative frequency of performance of each of the different actions.

At 1012, the method may further include determining for each user-time period combination, a new representation of the relative frequency at which each of the different actions was performed by the associated one of the plurality of users over the associated one of the one or more periods of time, as a weighted combination of the different characteristic behaviors in the new plurality of different characteristic behaviors.

At 1014, the method may further include determining for each user-time period combination, a new reconstruction error based at least in part on: (i) the relative frequency at which each of the different actions was performed by the associated one of the plurality of users over the associated one of the one or more periods of time and (ii) the new representation of the relative frequency at which each of the different actions was performed by the associated one of the plurality of users over the associated one of the one or more periods of time.

At 1016, the method may further include determining a new total reconstruction error based at least in part on the new reconstruction error determined for each user-time period combination.

At 1018, the method may further include determining if the new total reconstruction error is less than the total reconstruction error.

If the new total reconstruction error is less than the total reconstruction error, at 1020, the method may further include setting the plurality of characteristic behaviors for the behavior model to the new plurality of characteristic behaviors, setting the representation for each user-time period to the new representation for each user-time period, and setting the reconstruction error for each user-time period to the new reconstruction error for each user-time period.

At 1020, the method may further include determining if a termination criteria is satisfied.

If the termination criteria is not satisfied, the method may further include returning to 1010 and repeating 1010-1018. If the termination criteria is satisfied, the method may end at 1024.

As stated above, in some embodiments, learning may be repeated if there is a significant change to the operation of the entity.

Figure 12:
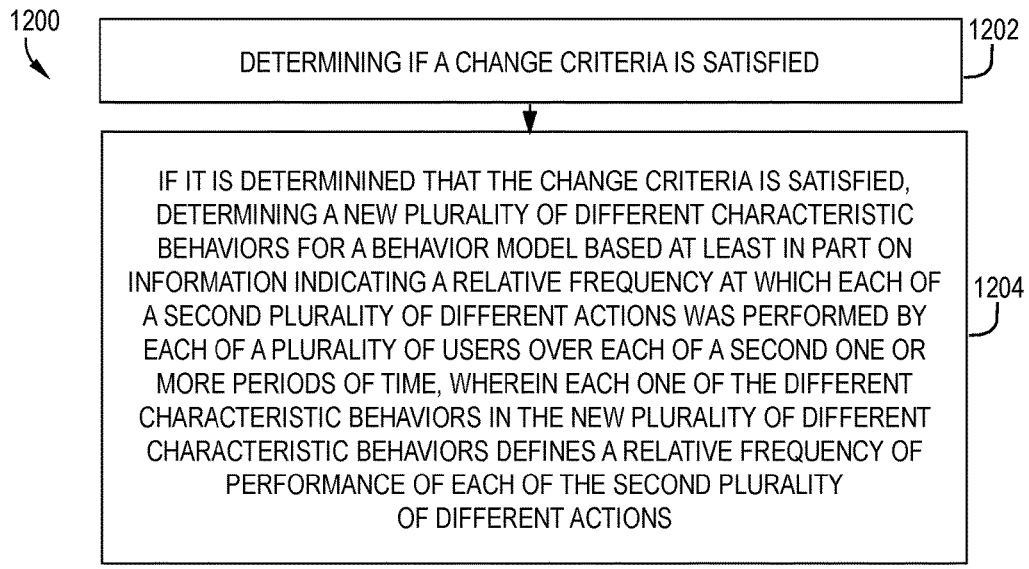
FIG. 12 is a flowchart of a method, in accordance with some embodiments.

FIG. 12 illustrates a flow chart of a method 1200 that may be used in determining if there has been a significant change to the operation of the entity, and if there has been a significant change to the operation of the entity, in determining a new plurality of different characteristic behaviors, in accordance with some embodiments.

Referring to FIG. 12, at 1202, the method may include determining if a change criteria is satisfied.

At 1204, the method may further include, if it is determined that the change criteria is satisfied, determining a new plurality of different characteristic behaviors based at least in part on information indicating a relative frequency at which each of a second plurality of different actions was performed by each of a plurality of users over each of a second one or more periods of time, wherein each one of the different characteristic behaviors in the new plurality of different characteristic behaviors defines a relative frequency of performance of each of the second plurality of different actions.

In some embodiments, the second plurality of different actions are the same as the first plurality of different actions.

Figure 11:
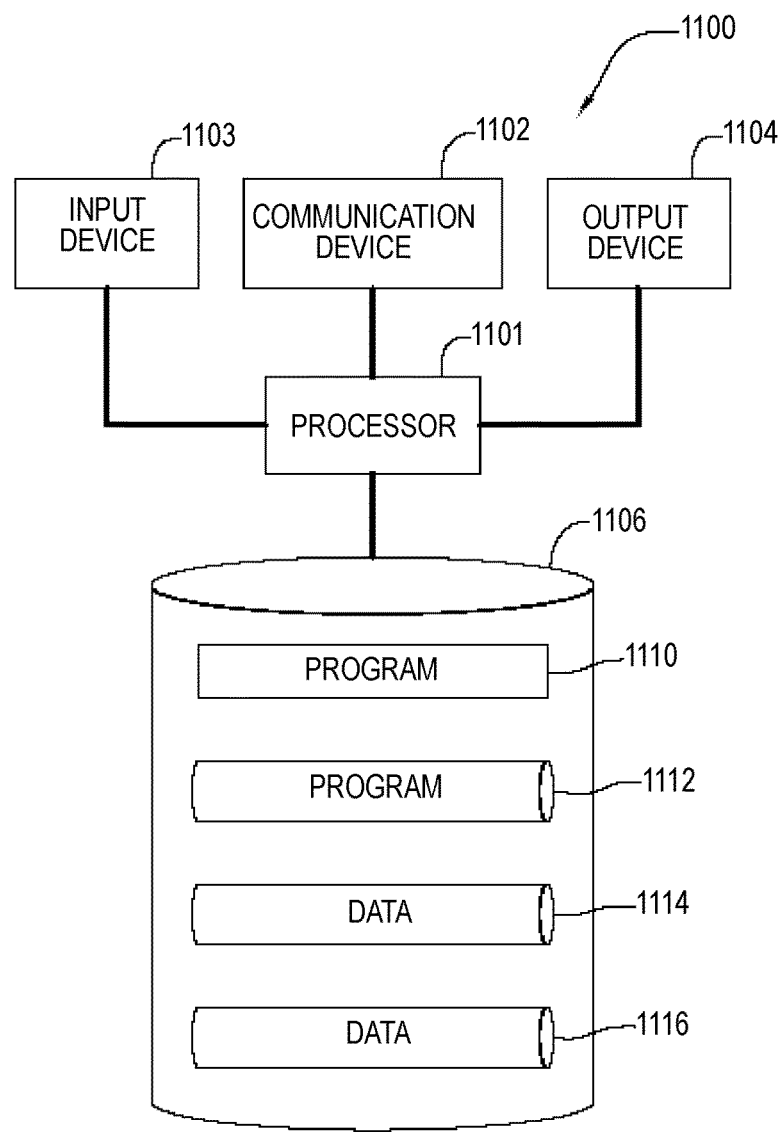
FIG. 11 is a block diagram of an architecture 1100, in accordance with some embodiments.

FIG. 11 is a block diagram of an architecture 1100 according to some embodiments. In some embodiments, one or more of the systems and/or devices (and/or portion(s) thereof) disclosed herein may have an architecture that is the same as and/or similar to one or more portions of the architecture 1100.

In some embodiments, one or more of the methods (or portion(s) thereof) disclosed herein may be performed by a system, apparatus and/or device having an architecture that is the same as or similar to the architecture 1100 (or portion(s) thereof).

The architecture may be implemented as a distributed architecture or a non-distributed architecture. A distributed architecture may be a completely distributed architecture or a partly distributed-partly non distributed architecture.

Referring to FIG. 11, in accordance with some embodiments, the architecture 1100 includes a processor 1101 operatively coupled to a communication device 1102, an input device 1103, an output device 1104 and a storage device 1106, each of which may be distributed or non-distributed.

In some embodiments, the processor 1101 may execute processor-executable program code to provide one or more portions of the one or more disclosed herein and/or to carry out one or more portions of one or more embodiments of one or more methods disclosed herein. In some embodiments, the processor executable program code may include, but is not limited to, event logging software, model determination software and/or detection software.

In some embodiments, the processor 1101 may include one or more microprocessors, such as, for example, one or more "general-purpose" microprocessors, one or more special-purpose microprocessors and/or application specific integrated circuits (ASICS), or some combination thereof. In some embodiments, the processor 1101 may include one or more reduced instruction set (RISC) processors.

The communication device 1102 may be used to facilitate communication with other devices and/or systems. In some embodiments, communication device 1102 may be configured with hardware suitable to physically interface with one or more external devices and/or network connections. For example, communication device 1102 may comprise an Ethernet connection to a local area network through which architecture 1100 may receive and transmit information over the Internet and/or one or more other network(s).

The input device 1103 may comprise, for example, one or more devices used to input data and/or other information, such as, for example: a keyboard, a keypad, track ball, touchpad, a mouse or other pointing device, a microphone, knob or a switch, an infra-red (IR) port, etc. The output device 1104 may comprise, for example, one or more devices used to output data and/or other information, such as, for example: an IR port, a display, a speaker, and/or a printer, etc.

In some embodiments, the input device 1103 and/or output device 1104 define a user interface, which may enable an operator to input data and/or other information and/or to view output data and/or other information. In some embodiments, a user interface enables an operator to perform various tasks on one or more systems and/or devices (and/or portion(s) thereof) that may be monitored, recorded, and/or analyzed.

The storage device 1106 may comprise, for example, one or more storage devices, such as, for example, magnetic storage devices (e.g., magnetic tape and hard disk drives), optical storage devices, and/or semiconductor memory devices such as Random Access Memory (RAM) devices and Read Only Memory (ROM) devices.

The storage device 1106 may store one or more programs 1110-1112 and/or other information for operation of the architecture 1100. In some embodiments, the one or more programs 1110-1112 include one or more instructions to be executed by the processor 1101 to provide one or more portions of one or more tasks and/or one or more portions of one or more methods disclosed herein. In some embodiments, the one or more programs 1110-1112 include one or more operating systems, database management systems, other applications, other information files, etc., for operation of the architecture 1100.

The storage device 1106 may store one or more databases and/or other information 1114-1116 for one or more programs. As used herein a "database" may refer to one or more related or unrelated databases. Data and/or other information may be stored in any form. In some embodiments, data and/or other information may be stored in raw, excerpted, summarized and/or analyzed form.

In some embodiments, the one or more programs and/or other information include one or more programs or other information files to track operations (e.g., operations performed by an operator, such as by saving data in an event record for certain operations performed by the operator). In some embodiments, the one or more programs and/or other information may be configured to track only specific operations, such as, for example, file transfers (e.g., files transferred from one computing device to another, files transferred from the one or more systems and/or devices (and/or portion(s) thereof) to a removable storage device, files transferred using email, etc.), file downloads, file uploads (e.g., to the Internet), files printed, files renames, and so forth. In some other embodiments, the software may be configured to track all types of operation.

In some embodiments, one or more systems and/or devices (and/or portion(s) thereof) disclosed herein may facilitate model determination and/or detection of suspicious and/or other anomalous activity.

In some embodiments, one or more portions of one or more embodiments disclosed herein may be embodied in a method, an apparatus, a system, a computer program product, and/or a non-transitory machine readable storage medium with instructions stored thereon. As used herein, a machine may be any type of machine. In some embodiments, a machine comprises a processor.

The term "memory" should be understood to encompass a single memory or storage device or two or more memories or storage devices.

The term "processor" should be understood to include one processor or two or more cooperating processors.

Unless stated otherwise, a processor may comprise any type of processor. For example, a processor may be programmable or non-programmable, general purpose or special purpose, dedicated or non-dedicated, distributed or non-distributed, shared or not shared, and/or any combination thereof. A processor may include, but is not limited to, hardware, software, firmware, and/or any combination thereof. Hardware may include, but is not limited to off the shelf integrated circuits, custom integrated circuits and/or any combination thereof. In some embodiments, a processor comprises a microprocessor. Software may include, but is not limited to, instructions that are storable and/or stored on a computer readable medium, such as, for example, magnetic or optical disk, magnetic or optical tape, CD-ROM, DVD, RAM, EPROM, ROM or other semiconductor memory. A processor may employ continuous signals, periodically sampled signals, and/or any combination thereof. If a processor is distributed, two or more portions of the control/storage circuitry may communicate with one another through a communication link.

Unless stated otherwise, a processing system is any type of system that includes at least one processor.

Unless stated otherwise, a communication link may be any type of communication link, for example, but not limited to, wired (e.g., conductors, fiber optic cables) or wireless (e.g., acoustic links, electromagnetic links or any combination thereof including, for example, but not limited to microwave links, satellite links, infrared links), and/or combinations thereof, each of which may be public or private, dedicated and/or shared (e.g., a network). A communication link may or may not be a permanent communication link. A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. A communication link may employ a protocol or combination of protocols including, for example, but not limited to the Internet Protocol.

In addition, unless otherwise stated, terms such as, for example, "in response to" and "based on" mean "in response at least to" and "based at least on", respectively, so as not to preclude being responsive to and/or based on, more than one thing.

In addition, unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A computer-implemented method comprising: receiving, in a processor, information defining a first of a plurality of different actions that may be performed by users wherein the first of the plurality of different actions and a second of a plurality of different actions each comprise copying of one or more files, moving one or more files, deleting one or more files, uploading one or more files, network transferring one or more files, or emailing one or more files that may be performed by users wherein the first action is a different action than the second action: receiving, in a processor, information indicating a relative frequency at which the first action and the second action was performed by each of a plurality of users over each of one or more periods of time;

determining, by a processor, a plurality of different characteristic behaviors comprising a first characteristic that defines a relative frequency of a performance of a first action of the plurality the different actions and a second characteristic that defines a relative frequency of a performance of a second action of the plurality the different actions over each of one or more periods of time; receiving, in a processor, information indicating a relative frequency at which the first action and the second action was performed by a user over a period of time; determining, by a processor, a representation of the relative frequency at which the first action and the second action was performed by the user over the period of time as a weighted combination of the first characteristic and the second characteristic; determining, by a processor, a reconstruction error based on (i) the relative frequency at which the first action and the second action was performed by the user over the period of time and (ii) the weighted combination of the first characteristic and the second characteristic; in a case that the reconstruction error is less than a threshold, indicating normal behavior, and in case that the reconstruction error is greater than the threshold, indicating anomalous behavior.

2. The computer-implemented method of claim 1, further comprising: determining, by a processor, a difference based at least in part on: (i) the relative frequency at which the first action and the second action was performed by a user over a period of time and (ii) the weighted combination representing the relative frequency at which the first action and the second action was performed by the user over the period of time; and comparing, by a processor, the difference to a criteria.

3. The computer-implemented method of claim 2, further comprising: displaying, based at least in part on the comparison, a result indicating whether anomalous behavior is detected on the part of the user.

4. The computer-implemented method of claim 1, wherein the determining, by a processor, a plurality of different characteristic behaviors based at least in part on the information indicating the relative frequency at which the first action and the second action was performed by each of the plurality of users over each of one or more periods of time, wherein each one of the different characteristic behaviors defines a relative frequency of performance of the first action and the second action, is performed without human supervision.

5. The computer-implemented method of claim 1, wherein the information indicating the relative frequency at which the first action and the second action was performed by each of the plurality of users over each of one or more periods of time includes: a plurality of user-time period combinations, each one of the user-time period combinations being associated with a respective combination of one of the plurality of users and one of the one or more periods of time; the method further comprising: determining, by a processor, for each user-time period combination, a representation of the relative frequency at which the first action and the second action was performed by the associated one of the plurality of users over the associated one of the one or more periods of time, as a weighted combination of the different characteristic behaviors each of which defines a relative frequency of performance of the first action and the second action.

6. The computer-implemented method of claim 5, the method further comprising: (a) defining, by a processor, a user-time period combination to be an outlier; (b) determining, by a processor, a new plurality of different characteristic behaviors, based at least in part on the information indicating the relative frequency at the first action and the second action was performed by each of the plurality of users over each of one or more periods of time with the exception of each user-time period combination defined to be an outlier, wherein each one of the different characteristic behaviors in the new plurality of different characteristic behaviors defines a relative frequency of performance of the first action and the second action; (c) determining, by a processor, if a termination criteria is satisfied; and (d) if it is determined that the termination criteria is not satisfied, repeating (a)-(b).

7. The computer-implemented method of claim 5, the method further comprising: defining, by a processor, a count indicating a number of different characteristic behaviors; wherein the determining, by a processor, a plurality of different characteristic behaviors comprises: determining, by a processor, a plurality of different characteristic behaviors that includes the indicated number of different characteristic behaviors, the method further comprising: (a) incrementing, by a processor, the count indicating a number of different characteristic behaviors; (b) determining, by a processor, a new plurality of different characteristic behaviors that includes the indicated number of different characteristic behaviors, based at least in part on the information indicating the relative frequency at which the first action and the second action was performed by each of the plurality of users over each of one or more periods of time, wherein each one of the different characteristic behaviors in the new plurality of different characteristic behaviors defines a relative frequency of performance of the first action and the second action: (c) determining, by a processor, if a termination criteria is satisfied; and (d) if it is determined that the termination criteria is not satisfied, repeating (a)-(b).

8. The computer-implemented method of claim 1, wherein the plurality of different actions is a first plurality of different actions; the method further comprising: determining if a change criteria is satisfied; and if it is determined that the change criteria is satisfied, determining a new plurality of different characteristic behaviors based at least in part on information indicating a relative frequency at which each of a second plurality of different actions was performed by each of a plurality of users over each of a second one or more periods of time, wherein each one of the different characteristic behaviors in the new plurality of different characteristic behaviors defines a relative frequency of performance of each of the second plurality of different actions.

9. The computer-implemented method of claim 8, wherein the second plurality of different actions are the same as the first plurality of different actions.

10. A non-transitory computer readable storage medium having code stored thereon, the code being executable by a processor to result in a method comprising: receiving information defining a first of a plurality of different actions that may be performed by users wherein the first of the plurality of different actions comprises copying of one or more files, moving one or more files, deleting one or more files, uploading one or more files, network transferring one or more files, or emailing one or more files and a second of a plurality of different actions that may be performed by users wherein the second of plurality of different actions comprises copying of one or more files, moving one or more files, deleting one or more files, uploading one or more files, network transferring one or more files, or emailing one or more files, and wherein the first action is a different action than the second action; receiving information indicating a relative frequency at which the first action and the second action was performed by each of a plurality of users over each of one or more periods of time; determining a plurality of different characteristic behaviors comprising a first characteristic that defines a relative frequency of a performance of a first action of the plurality the different actions and a second characteristic that defines a relative frequency of a performance of a second action of the plurality the different actions over each of one or more periods of time; receiving information indicating a relative frequency at which the first action and the second action was performed by a user over a period of time; determining a representation of the relative frequency at which the first action and the second action was performed by the user over the period of time as a weighted combination of the first characteristic and the second characteristic; determining, by a processor, a representation of the relative frequency at which the first action and the second action was performed by the user over the period of time as a weighted combination of the first characteristic and the second characteristic; determining a reconstruction error based on (i) the relative frequency at which the first action and the second action was performed by the user over the period of time and (ii) the weighted combination of the first characteristic and the second characteristic; in a case that the reconstruction error is less than a threshold, indicating normal behavior, and in case that the reconstruction error is greater than the threshold, indicating anomalous behavior.

11. The non-transitory computer readable storage medium of claim 10, the method further comprising: determining a difference based at least in part on: (i) the relative frequency at which the first action and the second action was performed by a user over a period of time and (ii) the weighted combination representing the relative frequency at which the first action and the second action was performed by the user over the period of time; and comparing, by a processor, the difference to a criteria.

12. The non-transitory computer readable storage medium of claim 10, further comprising: displaying, based at least in part on the comparison, a result indicating whether anomalous behavior is detected on the part of the user.

13. The non-transitory computer readable storage medium of claim 10, wherein the determining a plurality of different characteristic behaviors based at least in part on the information indicating the relative frequency at which the first action and the second action was performed by each of the plurality of users over each of one or more periods of time, wherein each one of the different characteristic behaviors defines a relative frequency of performance of the first action and the second action, is performed without human supervision.

14. The non-transitory computer readable storage medium of claim 10, wherein the information indicating the relative frequency at which the first action and the second action was performed by each of the plurality of users over each of one or more periods of time includes: a plurality of user-time period combinations, each one of the user-time period combinations being associated with a respective combination of one of the plurality of users and one of the one or more periods of time; the method further comprising: determining for each user-time period combination, a representation of the relative frequency at which the first action and the second action was performed by the associated one of the plurality of users over the associated one of the one or more periods of time, as a weighted combination of the different characteristic behaviors each of which defines a relative frequency of performance of the first action and the second action.

15. The non-transitory computer readable storage medium of claim 14, the method further comprising: (a) defining a user-time period combination to be an outlier; (b) determining a new plurality of different characteristic behaviors, based at least in part on the information indicating the relative frequency at which the first action and the second action was performed by each of the plurality of users over each of one or more periods of time with the exception of each user-time period combination defined to be an outlier, wherein each one of the different characteristic behaviors in the new plurality of different characteristic behaviors defines a relative frequency of performance of the first action and the second action; (c) determining if a termination criteria is satisfied; and (d) if it is determined that the termination criteria is not satisfied, repeating (a)-(b).

16. The non-transitory computer readable storage medium of claim 14, the method further comprising: defining a count indicating a number of different characteristic behaviors; wherein the determining, by a processor, a plurality of different characteristic behaviors comprises: determining a plurality of different characteristic behaviors that includes the indicated number of different characteristic behaviors, the method further comprising: (a) incrementing the count indicating a number of different characteristic behaviors; (b) determining a new plurality of different characteristic behaviors that includes the indicated number of different characteristic behaviors, based at least in part on the information indicating the relative frequency at which the first action and the second action was performed by each of the plurality of users over each of one or more periods of time, wherein each one of the different characteristic behaviors in the new plurality of different characteristic behaviors defines a relative frequency of performance of the first action and the second action: (c) determining if a termination criteria is satisfied; and (d) if it is determined that the termination criteria is not satisfied, repeating (a)-(b).

17. The non-transitory computer readable storage medium of claim 10, wherein the plurality of different actions is a first plurality of different actions: the method further comprising: determining if a change criteria is satisfied; and if it is determined that the change criteria is satisfied, determining a new plurality of different characteristic behaviors based at least in part on information indicating a relative frequency at which each of a second plurality of different actions was performed by each of a plurality of users over each of a second one or more periods of time, wherein each one of the different characteristic behaviors in the new plurality of different characteristic behaviors defines a relative frequency of performance of each of the second plurality of different actions; receiving, in a processor, information defining a first of a plurality of different actions that may be performed by users wherein the first of a plurality of different actions comprises copying of one or more files, moving one or more files, deleting one or more files, uploading one or more files, network transferring one or more files, or emailing one or more files.

18. A system comprising: a processor; and a memory, coupled to the processor and storing code executable by the processor; the processor configured to: receive information defining a first of a plurality of different actions that may be performed by users wherein the first of the plurality of different actions comprises copying of one or more files, moving one or more files, deleting one or more files, uploading one or more files, network transferring one or more files, or emailing one or more files and a second of a plurality of different actions that may be performed by users wherein the second of plurality of different actions comprises copying of one or more files, moving one or more files, deleting one or more files, uploading one or more files, network transferring one or more files, or emailing one or more files, and wherein the first action is a different action than the second action; receive information indicating a relative frequency at which the first action and the second action was performed by each of a plurality of users over each of one or more periods of time; determine a plurality of different characteristic behaviors comprising a first characteristic that defines a relative frequency of a performance of a first action of the plurality the different actions and a second characteristic that defines a relative frequency of a performance of a second action of the plurality the different actions over each of one or more periods of time; receive information indicating a relative frequency at which the first characteristic and the second characteristic was performed by a user over a period of time; and determine a representation of the relative frequency at which the first characteristic and the second characteristic was performed by the user over the period of time as a weighted combination of the first characteristic and the second characteristic; determine a reconstruction error based on (i) the relative frequency at which the first action and the second action was performed by the user over the period of time and (ii) the weighted combination of the first characteristic and the second characteristic; in a case that the reconstruction error is less than a threshold, indicate normal behavior, and in case that the reconstruction error is greater than the threshold, indicate anomalous behavior.

19. The system of claim 18, the processor further configured to: determine a difference based at least in part on: (i) the relative frequency at which the first action and the second action was performed by a user over a period of time and (ii) the weighted combination representing the relative frequency at which the first action and the second action was performed by the user over the period of time; and compare the difference to a criteria.

20. The system of claim 18, the processor further configured to: display, based at least in part on the comparison, a result indicating whether anomalous behavior is detected on the part of the user.

21. The system of claim 18, wherein the determine a plurality of different characteristic behaviors based at least in part on the information indicating the relative frequency at which the first action and the second action was performed by each of the plurality of users over each of one or more periods of time, wherein each one of the different characteristic behaviors defines a relative frequency of performance of the first action and the second action, is performed without human supervision.

22. The system of claim 18, wherein the information indicating the relative frequency at which the first action and the second action was performed by each of the plurality of users over each of one or more periods of time includes: a plurality of user-time period combinations, each one of the user-time period combinations being associated with a respective combination of one of the plurality of users and one of the one or more periods of time; the processor further configured to: determine for each user-time period combination, a representation of the relative frequency at which the first action and the second action was performed by the associated one of the plurality of users over the associated one of the one or more periods of time, as a weighted combination of the different characteristic behaviors each of which defines a relative frequency of performance of the first action and the second action.

23. The system of claim 22, the processor further configured to: (a) define a user-time period combination to be an outlier, (b) determine a new plurality of different characteristic behaviors, based at least in part on the information indicating the relative frequency at which the first action and the second action was performed by each of the plurality of users over each of one or more periods of time with the exception of each user-time period combination defined to be an outlier, wherein each one of the different characteristic behaviors in the new plurality of different characteristic behaviors defines a relative frequency of performance of the first action and the second action; (c) determine if a termination criteria is satisfied; and (d) if it is determined that the termination criteria is not satisfied, repeat (a)-(b).

24. The system of claim 22, the processor further configured to: define a count indicating a number of different characteristic behaviors; wherein the determine a plurality of different characteristic behaviors comprises: determine a plurality of different characteristic behaviors that includes the indicated number of different characteristic behaviors, the processor further configured to: t a) increment, by a processor, the count indicating a number of different characteristic behaviors; (b) determine, by a processor, a new plurality of different characteristic behaviors that includes the indicated number of different characteristic behaviors, based at least in part on the information indicating the relative frequency at which the first action and the second action was performed by each of the plurality of users over each of one or more periods of time, wherein each one of the different characteristic behaviors in the new plurality of different characteristic behaviors defines a relative frequency of performance of the first action and the second action; (c) determine if a termination criteria is satisfied; and (d) if it is determined that the termination criteria is not satisfied, repeat (a)-(b).

25. The system of claim 18, wherein the plurality of different actions is a first plurality of different actions; the processor further configured to: determine if a change criteria is satisfied; and if it is determined that the change criteria is satisfied, determine a new plurality of different characteristic behaviors based at least in part on information indicating a relative frequency at which each of a second plurality of different actions was performed by each of a plurality of users over each of a second one or more periods of time, wherein each one of the different characteristic behaviors in the new plurality of different characteristic behaviors defines a relative frequency of performance of each of the second plurality of different actions.

* * * * *

UNITED STATES PATENT AND TRADEMARK OFFICE
CERTIFICATE OF CORRECTION

PATENT NO. : 10,192,050 B2  
APPLICATION NO. : 14/964829  
DATED : January 29, 2019  
INVENTOR(S) : Abhishek Srivastav et al.

Page 1 of 1

It is certified that error appears in the above-identified patent and that said Letters Patent is hereby corrected as shown below:

On the Title Page

Item (72), Inventors:  
Second named inventor should read as: "Shiva Prasad Kasiviswanathan"

Signed and Sealed this  
Third Day of September, 2019

Andrei Iancu  
*Director of the United States Patent and Trademark Office*